(12) United States Patent
Clarke et al.

(10) Patent No.: US 6,383,395 B1
(45) Date of Patent: May 7, 2002

(54) WATER TREATMENT METHOD AND APPARATUS

(75) Inventors: Stephen R. Clarke; Richard J. Clarke, both of Orinda; Roderick Murdock, Canyon, all of CA (US); Clive J. Butler, Easton, PA (US); Sam Mohanta, Fremont, CA (US)

(73) Assignee: Luxfer Group Limited, Manchester (GB)

( * ) Notice: Subject to any disclaimer, the term of this patent is extended or adjusted under 35 U.S.C. 154(b) by 0 days.

(21) Appl. No.: 09/477,501

(22) Filed: Jan. 4, 2000

(51) Int. Cl.[7] ................................................. C02F 1/28

(52) U.S. Cl. .................... 210/683; 210/684; 210/688; 210/226; 210/228; 210/266; 210/282; 210/484; 210/493.1; 210/911; 210/913; 210/915; 210/679

(58) Field of Search ............................... 210/683, 684, 210/747, 679, 209, 266, 484, 282, 911, 688, 226, 228, 493.1, 912, 913, 915

(56) References Cited

U.S. PATENT DOCUMENTS

| 2,480,732 A | 8/1949 | Hendrickson ................ 23/252 |
| 3,002,932 A | 10/1961 | Duwell et al. .............. 252/179 |
| 3,332,737 A | 7/1967 | Kraus ........................... 23/50 |
| 3,345,422 A | 10/1967 | Piester et al. .............. 260/650 |
| 3,346,422 A | 10/1967 | Berger ....................... 136/148 |
| 3,382,034 A | 5/1968 | Kraus .......................... 423/24 |

(List continued on next page.)

FOREIGN PATENT DOCUMENTS

WO    PCT/IB00/01890    5/2001

OTHER PUBLICATIONS

David R Rae, "Arsenic Tragedy in Bangladesh", pp. 128–132, C&EN (1999).

Yasuo Tanaka et al., "Adsorption and desorpotion method for cacodylic acid with inorganic ion exchangers", pp. 205–215, Applied Orgnometallic Chemistry, (1990).

Timothy J. Badger et al., "Utility of an Insoluble, On–Demand Oxidant for Analysis and Removal of Arsenic in Bangladesh Drinking Water", 6 pages, Affiniti Water Technologies (date unknown).

MEI internal memo, "Alternative Technologies for Arsenic Treatment," 11 pages (not published).

(List continued on next page.)

Primary Examiner—Peter A. Hruskoci
(74) Attorney, Agent, or Firm—Watts Hoffman Fisher & Heinke

(57) ABSTRACT

A media is used to remove species from aqueous solutions, particularly in the treatment of water to enable it to be suitable for drinking. The media includes a material selected from the group consisting of zirconium hydroxide, titanium hydroxide, hafnium hydroxide and combinations thereof. A preferred form of the media is a layer having an aspect ratio of at least 1:1, more preferably, at least about 10:1. Removed from the water are species selected from the group consisting of arsenate, selenate, chromate, borate, perchlorate, fluoride and combinations thereof. In particular arsenite ($As^{+3}$) containing species are also removed from water. Arsenite may be removed from water to levels not greater than 10 parts per billion with a single exposure to the media. The media is selective for certain species over others. The arsenite component is removed despite a presence of at least one competing species selected from the group consisting of sulphate, phosphate, nitrate, bicarbonate, iron, carbonate, nitrite, silicate, sulphite, chloride, bromide and iodide. The media is preferably in powder form while used to treat water. The media may be employed in a variety of devices including cartridge type water filters and a filter press.

59 Claims, 9 Drawing Sheets

U.S. PATENT DOCUMENTS

| | | | |
|---|---|---|---|
| 3,382,035 A | 5/1968 | Slater | 23/66 |
| 3,522,187 A | 7/1970 | Kraus et al. | 252/182 |
| 3,561,600 A | 2/1971 | Kurita | 210/225 |
| 3,718,559 A | 2/1973 | Wallace | 204/180 G |
| 3,817,381 A | 6/1974 | Heskett et al. | 210/140 |
| 3,850,835 A | 11/1974 | Marantz et al. | 252/182 |
| 4,036,655 A | 7/1977 | Yamada et al. | 106/77 |
| 4,080,290 A | 3/1978 | Klantschi et al. | 210/692 |
| 4,083,298 A | 4/1978 | Schotten | 100/214 |
| 4,177,228 A | 12/1979 | Prolss | 264/24 |
| 4,178,270 A | 12/1979 | Fujita et al. | 252/447 |
| 4,196,084 A | 4/1980 | Schotten | 210/224 |
| 4,222,873 A | 9/1980 | Parsons | 210/777 |
| 4,284,726 A * | 8/1981 | Shigetomi | 521/28 |
| 4,362,626 A * | 12/1982 | Takeuchi et al. | 210/670 |
| 4,399,026 A | 8/1983 | Shiroto et al. | 208/216 PP |
| 4,400,305 A | 8/1983 | Takeuchi et al. | 252/430 |
| 4,405,574 A | 9/1983 | Lee et al. | 423/574 |
| 4,405,576 A | 9/1983 | Lee et al. | 423/181 |
| 4,415,677 A | 11/1983 | Lee et al. | 521/28 |
| 4,415,678 A | 11/1983 | Lee et al. | 521/28 |
| 4,474,853 A | 10/1984 | Watanabe | 428/403 |
| 4,488,949 A | 12/1984 | Lee et al. | 521/28 |
| 4,576,969 A * | 3/1986 | Echigo et al. | 521/28 |
| 4,661,282 A * | 4/1987 | Clark | 252/179 |
| 4,692,431 A | 9/1987 | Weller | 502/417 |
| 4,725,357 A | 2/1988 | Downing et al. | 210/611 |
| 4,801,386 A | 1/1989 | Sugimori et al. | 210/680 |
| 4,808,316 A | 2/1989 | Otomura et al. | 210/664 |
| 4,828,698 A * | 5/1989 | Jewell et al. | 210/266 |
| 4,855,059 A | 8/1989 | Frianeza-Kullberg | 210/670 |
| 5,071,563 A | 12/1991 | Shiga et al. | 210/670 |
| 5,169,528 A | 12/1992 | Karbachsch et al. | 210/264 |
| 5,273,650 A | 12/1993 | Vermes et al. | 210/264 |
| 5,277,931 A | 1/1994 | Maglio et al. | 427/212 |
| 5,290,457 A * | 3/1994 | Karbachsch et al. | 210/792 |
| 5,536,415 A | 7/1996 | Joubert | 210/670 |
| 5,578,218 A | 11/1996 | Matsuoka et al. | 210/672 |
| 5,607,892 A | 3/1997 | Chopin et al. | 502/304 |
| 5,618,437 A | 4/1997 | Ulan et al. | 210/679 |
| 5,705,634 A | 1/1998 | Bredehorst et al. | 536/124 |
| 5,895,796 A | 4/1999 | Mouri et al. | 524/413 |
| 5,948,265 A | 9/1999 | Wakamatsu et al. | 210/683 |
| 6,077,809 A | 6/2000 | Suzuki et al. | 502/400 |
| 6,197,193 B1 * | 3/2001 | Archer | 210/266 |

OTHER PUBLICATIONS

Maeck et al, "Absorption of the Elements on Inorganic Ion Exchanbers from Nitrate Media," pp. 2086–2090, Analytical Chemistry, vol. 35, No. 13 (1963).

Bigliocca et al., "Radiochemical Separations by Absorption on Manganese Dioxide," pp. 1634–1639, Analytical Chemistry, vol. 39, No. 13 (1967).

Sabbione et al., "The Selective Removal of $^{32}P$ From Activated Specimens In Neutron Activation Analysis," pp. 289–297, Journal of Radioanalytical Chemistry, vol. 4 (1970).

Ganzerli–Valentini et al., "Radiochemical Separations by Adsorption on Some Oxides of Groups IVB and VB," pp. 191–204, Journal of Radioanalytical Chemistry, vol. 16 (1973).

Shanks et al., "Application of Inorganic Ion Exchangers To Metallurgy," Report of Investigation—U.S. Bureau of Mines, pp. 1–19 (1983).

Tanaka et al., Selective Absorption of Dimethylarsinic Acid by Synthetic Inorganic Ion Exchangers [1], pp. 661–664, Chemistry Letters (1990).

Date Sheet 310, "Zirconium Hydroxide" Jan. 1985.

POTABLE As⁻ FREE WATER

WATER TREATMENT METHOD AND APPARATUS

FIELD OF THE INVENTION

The present invention is directed to the removal of species from aqueous solutions. In particular, the present invention is directed to the removal of species including an arsenic [III] component from groundwater in purification for drinking.

BACKGROUND OF THE INVENTION

Ion exchange beds are used to remove toxic ions from solutions. In general, ion exchange beds use columns of polymeric material with suitable ion exchange sites, such as sulphonic acid groups or quaternary ammonium salts, which are grafted onto a polymer matrix. The polymeric material is often in the form of beads, which are usually about the size of a grain of rice. The ion exchange process, such as the exchange of chloride ions on the surface of the beads for nitrate ions in an aqueous solution, occurs mainly at the surface of the bead. Consequently, the capacity of an ion exchange column is a function of the number of beads and the available ion exchange sites on the surface of individual beads. Very little of the ion exchange capacity on the inside of the bead is utilized. As a consequence, the capacity of an ion exchange column is typically much smaller than the total number of chemical reactions the ion exchange media could theoretically undergo.

The rate of the ion exchange reaction is further slowed as the reaction depends on the diffusion of the toxic ions into and out of the resin. The concentration of the toxic ions will be lower at the surface of the resin than in the bulk of the liquid. Each section of the column may be considered as an area where an equilibrium is set up between the leaving ion and the entering ion at their relative concentrations. As an aqueous solution moves up or down the ion exchange column and is exposed to clean resin surfaces, the ion exchange reaction is more rapid. This process is analogous to distillation and the concept of theoretical plates. Consequently, when ion exchange columns are used to remove toxic ions from liquid solutions, those skilled in the art favor longer columns to increase the time the aqueous solution is in contact with the ion exchange media.

In order to allow the aqueous solution containing the toxic ions to flow through the column and come into contact with as many ion exchange sites on the resin as possible, those skilled in the art further prefer the ion exchange media to have good hydraulic permeability throughout. Consequently, when zirconia has been used as a component in ion exchange media, those skilled in the art have modified the zirconia, ice. by creating bead like particles using polymeric compounds, to increase the hydraulic permeability of the column. While these modifications to the zirconia increase the ion exchange media's hydraulic permeability, they limit the media's capacity as fewer ion exchange sites are accessible to the toxic ions in the aqueous solution.

Arsenic is a toxin that may be found in various types of water from commercial effluents to naturally occurring groundwater. The presence of arsenic in water creates difficulties in the removal processes as well as in disposal of the media or regeneration solution. Recently, the presence of arsenic in groundwater has lead to a crisis in the Bengal Basin. As described in an article from C&EN, pp. 128–132, Dec. 6, 1999, the United Nations International Children's Emergency Fund (UNICEF) installed millions of wells in Bangladesh villages in the 1970's in an attempt to provide the frequently flood ravaged country with safe drinking water. The program was an early success, drastically reducing instances of cholera and other diseases in the country. Unfortunately, the groundwater was contaminated and people began to suffer from arsenic poisoning.

The World Health Organization sets the standard of acceptable arsenic levels in drinking water at 50 parts per billion (ppb). New laws may set this standard even lower, to levels not greater than 10 ppb. In view of poor testing methods and without the means to achieve even the current standards of safe arsenic levels in Bangladesh, the tragedy continues in that region.

Arsenic exists in two soluble and dangerous oxidation states, $As^{+3}$, which is known as arsenite and $As^{+5}$, which is known as arsenate. Both forms are toxic and exist in groundwater, although arsenite is the more lethal and the more difficult to remove.

The Environmental Protection Agency (EPA) and others believe that arsenite predominates in aquifers due to a lack of oxygen and oxidizing species that can convert the arsenite to arsenate. This is not the case with surface waters where oxygen is plentiful and there are other ions such as ferric ions which can complete the oxidation. It has been believed that arsenite cannot be as easily removed as the arsenate ion because arsenite is only very slightly ionized in water. The ionization constant for arsenite is only $5 \times 10^{-10}$ compared to the first ionization constant of arsenate, $5.6 \times 10^{-3}$. Some processes chemically oxidize the arsenite to arsenate to facilitate its removal, but this creates an additional step in the removal process.

There have been various proposals for removing arsenic from drinking water including precipitation with iron or copper and attempts to immobilize the arsenic with biological agents. These approaches have various problems, not the least of which is the difficulty of removing arsenic to the very low levels that are required for safe drinking, on the order of parts per billion. Other difficulties are that other competing ions for ion exchange sites or ions unnecessarily precipitated, are on the order of parts per million, a thousand times more material than arsenic species. Large amounts of non-toxic and beneficial ions are removed along with the very much smaller amounts of arsenic. Accordingly, the removed material is bulkier than necessary, toxic and a disposal problem.

There is a need for an efficient, economical, and high capacity water treatment method and apparatus for removing toxic ions from aqueous solutions and from groundwater in particular. This process should be capable of removing arsenic to levels not greater than 10 ppb. The media should be capable of being regenerated repeatedly with little loss in capacity, to reduce costs and provide for continuous use of wells. The system must be safe and prevent loss of removed arsenic during operation. There must be a minimum amount of waste and the device should be suitable for use in low pressure applications such as wells. Finally, the system should be easy to use and inexpensive to obtain and operate. A step change in technology is required to satisfy all of these needs.

SUMMARY OF THE INVENTION

The present invention advantageously satisfies the above needs. Arsenite and arsenate may be removed to safe levels not greater than 10 ppb and even to 1 ppb levels, using a ceramic media of the present invention. The inventive media is nontoxic, insoluble and chemically and biologically stable. The media has a very high affinity not only for ionic arsenate species, but also for the soluble and nonionic arsenite species. In view of its stability, the inventive media may be used over and over again. Little or no loss in capacity has been observed and the process of stripping arsenic from the ceramic creates a minimum secondary waste.

Arsenite removal occurs in an anomalous way in the inventive media. The notoriously difficult-to-remove arsenite is much more easily removed at a high capacity compared to arsenate. This is surprising in that arsenite is poorly ionized. When the media reaches full capacity the outlet concentration may be equal to the input concentration with no spiking that is observed with ion exchange systems. The inventive media is not strictly an ion exchange material in the normal sense of the term, though it may be used to remove certain ionic species. The inventive media behaves differently than an ion exchange media since it also has the ability to remove nonionic species very well. Removal of arsenite and arsenate is achieved using benign chemical solutions.

The inventive media will remove nonionic arsenite in addition to certain ionized species such as chromate. Advantageously, however, the media is selective in that it shows little or no interference from species including iron, sulfate, nitrate, chloride and bicarbonate. Such species may be present in much higher concentrations than arsenic. Many sites would be lost and a greater amount of residue would be created during regeneration if the media were to react with these ions over arsenite.

In the present invention the media includes a material selected from the group consisting of zirconium hydroxide, titanium hydroxide, hafnium hydroxide, and combinations thereof. The media may be efficiently and economically used in a water treatment apparatus for domestic and commercial systems, including point of use drinking water treatment. The term "media" as used herein is meant to refer to the active composition that removes the intended species, such as the $As^{+3}$ species, from water. This term is not intended to be limited to a certain form or shape of media. The media may take the form of a powder, although other forms of the media may also be suitable. Preferably, the media is a powder having a water content characterized by a loss on ignition of at least 40% when heated at 1000° C. for one hour. The media is preferably used as a layer with an aspect ratio greater than that of a column. The aspect ratio of the layer is at least 1:1, more preferably, at least about 10:1. The preferred aspect ratio of at least about 10:1 results in devices having efficient flow of solution therethrough suitable for residential and other commercial applications. The term "aspect ratio" is used herein to refer to the area of the layer that is exposed to the liquid to be treated, divided by the thickness of the layer through which the liquid must travel in the process of removing intended species therefrom. The zirconium hydroxide powder may have a density upon tamping to constant volume, of at least 0.7 g/ml. The media need not be applied to other supports such as resin beads, charcoal, and the like. Such forms of media typically require heating the media, which undesirably diminishes the activity of its active component.

A preferred use of the present invention is in the treatment of water, such as groundwater, so as to make it suitable for drinking. Groundwater has different competing ions that render its treatment unique, especially in the removal of arsenic compounds in view of their relatively small concentration. The present invention may be suitable for use in treating other aqueous solutions as well, such as commercial effluents. The invention may be used to remove a variety of ions from aqueous solutions such as arsenate, selenate, chromate, borate, perchlorate, fluoride and the like. The inventive zirconium hydroxide media has a greater affinity for some of these species than others. With respect to arsenic, the arsenite form is much more strongly adsorbed than arsenate. This is quite unexpected since the form of arsenite removed from groundwater is nonionic. Therefore, the ion exchange function would not be expected to have an effect on the removal of arsenite. It has further been discovered that arsenic compounds are more strongly adsorbed than most other oxyanions except chromate. This surprising discovery increases the efficiency and utility of the present invention because sulfate, chloride and bicarbonate ions usually exist in well water in much higher concentrations than arsenic.

These and other objects of the invention can be achieved in part because, surprisingly, it has been found that zirconium hydroxide, particularly in its freshly prepared form (from aqueous medium), has a much greater affinity for toxic ions and species than had previously been assumed. While not wanting to be bound by theory, it is believed that this affinity is the result of a ligand effect between the zirconium hydroxide, especially when freshly prepared and significantly hydrated, and the species in a contaminated aqueous solution. Because of this unexpected increased affinity, a long ion exchange bed is unnecessary and even undesirable.

A preferred aspect of the present invention is directed to the use of a layer of media having an aspect ratio of at least 1:1, more preferably, at least about 10:1, to remove species comprising a nonionic arsenite ($As^{+3}$) component from water. The media comprises a material selected from the group consisting of zirconium hydroxide, titanium hydroxide, hafnium hydroxide and combinations thereof. Preferred media materials include at least one of zirconium hydroxide and titanium hydroxide. The water is exposed to the media effective to remove the $As^{+3}$ component to low levels, preferably to a level not greater than 10 ppb and even to a level not greater than 1 ppb. The inventive media is capable of removing other species as well, including ions selected from the group consisting of arsenate, selenate, chromate, borate, perchlorate, fluoride and mixtures thereof. However, a preferred aspect of the invention, is the removal of the nonionic $As^{+3}$ component, which is notoriously difficult to remove in view of it uncharged character.

The present invention overcomes the typical difficulties in removing $As^{+3}$ components. Some processes that seek to remove $As^{+3}$ species first convert the species to $As^{+5}$, which is easier to remove. This indirect removal of $As^{+3}$ species is disadvantageous in that additional steps are required. Other competitive technologies such as activated alumina require the use of extended columns which may be considered bulky in certain applications. The inventive media is advantageous in that it may be regenerated repeatedly with little or no loss in capacity. This will minimize costs and provide for continuous use of wells being purified. The present invention operates safely, without significant loss of captured arsenic over intended periods of use. There is a minimal amount of waste. Moreover, the present invention may be used in a low pressure device. This is unexpected in that, in the case of the powder form of the media, one would believe that high pressures are required to achieve suitable flow rates through a powder. The present invention achieves degrees of $As^{+3}$ removal, efficiency and safety that heretofore have not been obtainable. The present media shows little or no interference from some ionic species that occur in much greater concentrations than arsenite. As a result, the present invention does not suffer from excessive loss of reactive sites that would occur upon reaction with such ionic species, nor does it suffer from difficulties in regenerating such excessive residues.

Referring now to more specific features of the present invention, one embodiment of the invention is directed to a method of treating an aqueous solution, comprising passing an aqueous solution into contact with a layer of media having an aspect ratio of at least 1:1, more preferably, at least about 10:1. The media comprises a material selected from the group consisting of zirconium hydroxide, titanium hydroxide, hafnium hydroxide and combinations thereof. The solution is exposed to the media effective to remove therefrom species comprising an $As^{+3}$ component in non-ionic form. The solution with the species removed is passed from the media.

A preferred embodiment of the present invention is directed to a method of treating water, comprising passing water into contact with the layer of media having an aspect ratio of at least 1:1, more preferably, at least about 10:1, wherein the media comprises zirconium hydroxide. The water is exposed to the media effective to remove therefrom species comprising an $As^{+3}$ component in nonionic form. The water with the species removed is passed from the media.

Another embodiment of the present invention is directed to a device for treating an aqueous solution. The device comprises a housing and at least one porous layer is constructed and arranged to partition the housing into an untreated solution region and a treated solution region. A layer of the inventive media having an aspect ratio of at least 1:1, more preferably, at least about 10:1, is disposed in the untreated region adjacent the at least one porous layer. A seal engages the porous layer to prevent fluid communication between the untreated region and the treated region other than through the at least one porous layer. An inlet is adapted to communicate a source of an untreated aqueous solution to the untreated region of the housing. An outlet discharges a treated aqueous solution from the treated region of the housing. In one form of the invention, the layer is wetted at all times during solution processing.

More specific device features are that the inlet is adapted to be fastened to a spout leading from a tube well or water line of a sink. The layer of media and the at least one porous layer may take a variety of shapes, including generally cylindrical or planar. The device may comprise a cartridge that is adapted to be removably fastened in the housing, the cartridge comprising the layer of media and the at least one porous layer. The porous layer may include a plurality of pleats, or it may be flat.

Yet another embodiment of the invention is directed to a filter press type device for treating an aqueous solution, comprising a plurality of sets of press members. Each set of press members comprises a hollow frame member, a layer of the inventive media, a filter cloth and a back plate. The hollow frame member includes a central opening for passing fluid therethrough. A fluid inlet leads to the frame member so as to communicate an untreated aqueous solution to the central opening. The media is disposed so as to obturate the central opening. A back plate has indentations formed therein, the back plate being configured and arranged so as to obturate the central opening. A porous layer is disposed between the back plate and the frame member so as to obturate the central opening. A fluid outlet leads from the back plate so as to discharge a treated aqueous solution from the back plate. Support and movement of the press members is facilitated in a known manner. The press members are pressed together under pressure so as to form a water tight seal between the press members of each set and between adjacent sets of press members. When the press members are compressed, an untreated aqueous solution enters the frame member and passes through the media where toxic or undesirable species are removed. The solution with removed species passes through the filter cloth which prevents movement of the media. The treated solution travels via the indentations to the outlet tube where it is discharged from the press.

Much has been said up to this point about the ability of the inventive media to perform in a manner unlike ion exchange materials in its affinity for nonionic arsenite. However, the inventive media removes ionic species from water as well. In regards to the removal of ionic species in accordance with the present invention, a method of treating an aqueous solution comprises passing the solution into contact with a layer of the inventive media having an aspect ratio of at least 1:1, more preferably, at least about 10:1. The aqueous solution is exposed to the media effective to remove ionic species therefrom, and the aqueous solution with the species removed is passed from the media. The species that may be removed are selected from the group consisting of arsenate, selenate, chromate, borate, perchlorate, fluoride and combinations thereof.

Regarding particular features of the invention, the media is untreated with acid. The $As^{+3}$ component is removed from the aqueous solution after a single exposure to the media so as not to be present in an amount greater than about 10 parts per billion, even more preferably, in an amount not greater than about 1 part per billion. The $As^{+3}$ component is removed directly from the aqueous solution without conversion to a species comprising $As^{+5}$ prior to removal of the $As^{+3}$ component. The aqueous solution is preferably groundwater treated so as to be suitable for drinking. The aqueous solution preferably has a pH ranging from about 6.5 to about 7.5. The water may be delivered from a tube well or from a source of water leading to a sink.

The media is in a form of a powder having a water content characterized by a loss on ignition of at least 40% when heated at 1000° C. for 1 hour. The media may comprise zirconium hydroxide or titanium hydroxide. The zirconium hydroxide media has a density upon tamping to constant volume, of at least 0.7 g/ml. The species that may be removed are selected from the group consisting of arsenate, selenate, chromate, borate, perchlorate, fluoride and combinations thereof. A ratio of species removal, $As^{+3}$ component/$As^{+5}$ component, is at least 4:1. The $As^{+3}$ component is removed to not greater than 10 ppb despite a presence of at least one competing species selected from the group consisting of sulphate, phosphate, nitrate, bicarbonate, iron, carbonate, nitrite, silicate, sulphite, chloride, bromide and iodide.

These and other objects, features and advantages of the present invention will become apparent from the following detailed description and the accompanying drawings which illustrate, by way of example, the principles of the present invention.

DETAILED DESCRIPTION OF PREFERRED EMBODIMENTS

Figures 1, 2:
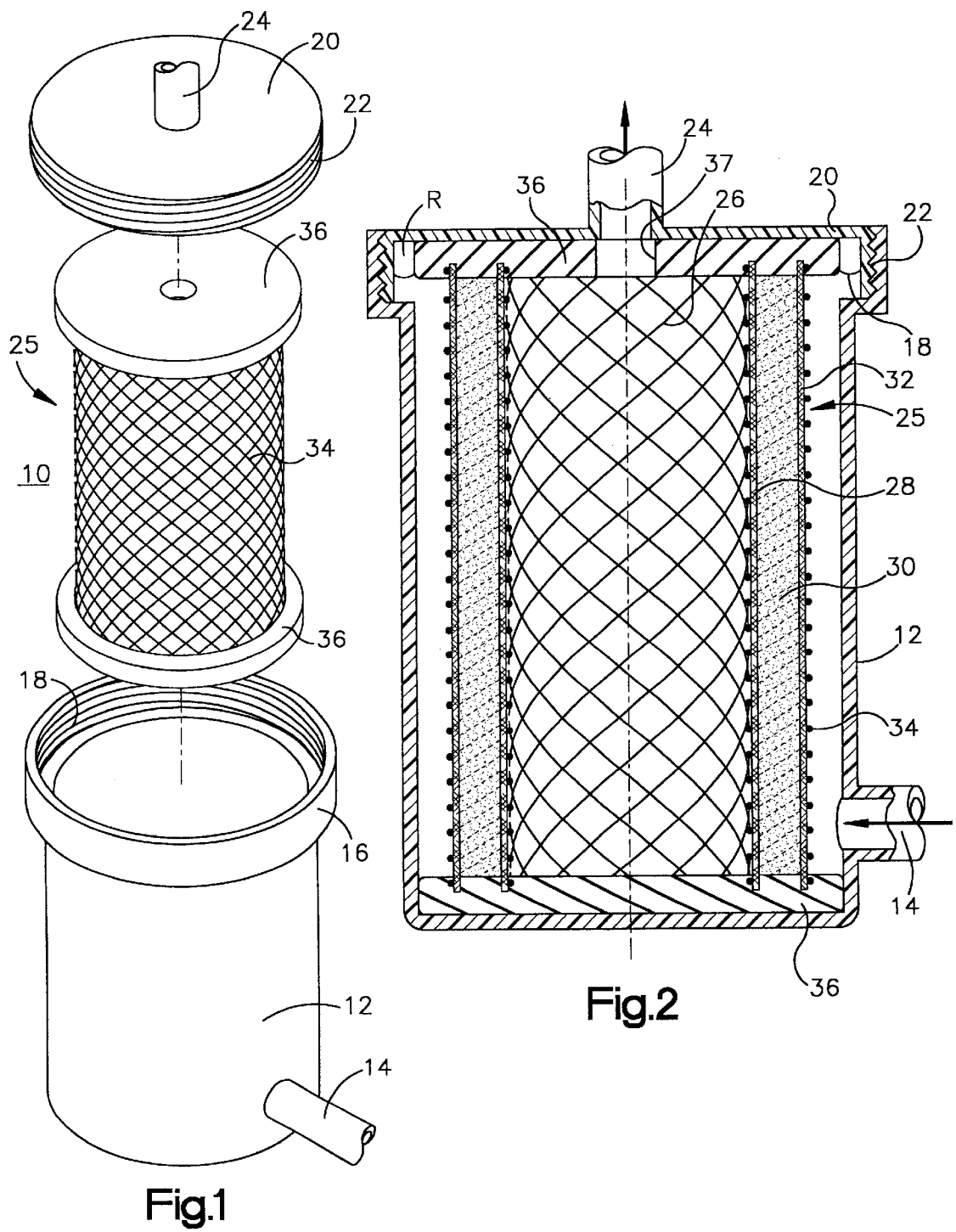
FIG. 1 is an exploded view of one device constructed in accordance with the present invention.
FIG. 2 is a vertical cross-sectional view of the device shown in FIG. 1.

The present invention uses methods and apparatuses that accommodate the media's low hydraulic permeability and which maximize the availability of the media's reactive sites to the species in aqueous solutions. The invention includes the use of zirconium hydroxide and/or titanium hydroxide media in hydrous forms to remove species from aqueous solutions.

It has been learned that zirconium hydroxide is a better agent for removing toxic ions or species than zirconia. It is believed that reactive sites in the zirconium hydroxide are lost during the process of converting zirconium hydroxide into zirconia. While recent writings have explored new applications for zirconium hydroxide (such as using zirconium hydroxide as a separation agent in organic chemistry to remove alpha hydroxy carboxylic acids), these writings, as well as those skilled in the art, remain focused on modifying zirconium hydroxide, i.e. by polymerization, to make large, more manageable particles and more hydraulically permeable media so that it can be used in ion exchange columns.

Using zirconium hydroxide as a powder in the present invention which need not be reacted with other compounds, flies in the face of conventional wisdom. The hydraulic permeability of zirconium hydroxide in powder form is too low for use of this material to be believed to be practical. For instance, a 1 inch column of zirconium hydroxide 5 inches long would require about 10 hours to allow the passage of 1.5 liters of water. In contrast, a column filled with a typical ion exchange resin will pass 1.5 liters of water in 10 minutes at the same head pressure. The foregoing comparison to a column is provided to illustrate the different hydraulic permeability between the inventive media and a typical ion exchange resin. The media of the present invention is unsuitable for use in a column.

Unexpectedly, it has been found that the ion capturing capacity of zirconium hydroxide is much higher (1–2 orders of magnitude) than traditional ion exchange materials. It has further been discovered that by using zirconium hydroxide in its natural, unmodified form, and avoiding the addition of other agents that would dilute the effect of the zirconium hydroxide or create impenetrable beads, the present invention exploits the benefits of the zirconium hydroxide to the fullest extent without the need for long ion exchange columns. Thus, it my be advantageous if the media used to remove the species from solution comprises zirconium hydroxide (or preferably hydrated zirconium hydroxide).

A further benefit of the present invention derives from the fact that the inventive zirconium hydroxide may be used both to remove ions and, upon reversal, to release ions in the same way as organic ion exchange agents. Unlike other ion exchange materials, zirconium hydroxide resists oxidation and destruction of its structure by most chemical or biological agents. It is not attacked by swelling due to pH changes as the material is used to sorb and desorb toxic ions. The material is benign and non toxic in its own right and inexpensive compared to competitive materials. Toxic anions such as chromate may be removed from zirconium hydroxide by treating the zirconium hydroxide with sodium hydroxide solution. The sodium hydroxide solution will react with what is believed in theory to be a zirconium hydroxide - chromate ligand complex, to form soluble sodium chromate while leaving the zirconium hydroxide insoluble and free from chromate. The two components may be separated by flushing with water. A similar technique may be used to regenerate arsenate/arsenite reacted zirconium hydroxide, titanium hydroxide and hafnium hydroxide.

The present invention includes the use of zirconium hydroxide attached to various substrates or porous layers, and is preferably in the form of a "paste." Although the term "paste" may be used to describe the hydrous powder form of the media, this form of the media is different than the usual understanding of a paste in that it does not exhibit good flow properties. In one preferred embodiment of the present invention, the water treatment apparatus of the present invention is made up of a system where incoming fluid, which has been contaminated with a toxic species such as arsenic, passes through a layer of zirconium hydroxide having an aspect ratio of at least about 10:1. As the contaminated solution passes through the thin layer of zirconium hydroxide, the arsenic species are removed from the solution. While not wanting to be bound by theory, it is believed this occurs due to a ligand effect between the zirconium hydroxide and the toxic ions. The solution which passes out of the zirconium hydroxide layer is substantially free of arsenic. In our experiments we have used layers of ¼ inch to treat water containing 1000 ppb arsenite and reduced this to less than 1 ppb. One kilogram of the media may remove 45 g of As[III] or 7.5 g of As[V] at concentrations of 1000 ppb. Thinner media layers for more dilute solutions of arsenite are feasible. It will depend on the flow rate and capacity required.

As another example of the present invention, zirconium hydroxide may be pasted onto porous media, plastic films, glass frits, porous paper, cloth, porous plastic, sintered metal, or natural products such as rice husks, charred nutshells and the like, that allow the zirconium hydroxide to be dispersed over a large surface.

Those skilled in the art will appreciate that hafnium hydroxide or titanium hydroxide may also be used to remove toxic ions from an aqueous solution, in the place of or in combination with zirconium hydroxide or one another.

In the present invention, the phrase "hydrated" zirconium hydroxide means zirconium hydroxide that includes water within its crystal structure. The term "hydrated" refers to water of crystallization and/or coordination as opposed to water that is simply adsorbed on the zirconium hydroxide itself. Although the zirconium hydroxide is suitable when in an amorphous form, other forms may also be suitable.

A preferred media is zirconium hydroxide media layer material commercially available from Magnesium Elektron, Inc, which has the characteristics described herein. This powder readily clumps together and does not flow well. It may be compacted easily but shapes formed thereby are very easily broken down with slight pressure. The media disperses easily in water and, once in a slurry, can settle out easily if no agitation is applied.

The moisture content of the zirconium hydroxide media layer material commercially available from Magnesium Elektron, Inc., is characterized by a loss on ignition ("LOI") of at least 40% upon heating at 1000° C. for 1 hour. This material has an LOI, for example, ranging from about 48–52%, although an LOI ranging from 47% to 55% and even outside this range, may be obtained for this material. The LOI indicates a level of moisture content of the media: the higher the LOI, the higher the water content of the media. The LOI values are taken from media that has not been used to treat water and are not taken while the media is being used to treat water. Those skilled in the art in view of this disclosure would appreciate that the inventive media may have a different LOI value when tested in the latter two circumstances. The zirconium hydroxide media layer material commercially available from Magnesium Elektron, Inc., has a density when tamped to constant volume, of at least 0.7 g/ml across the LOI range of 47% to 55%.

The density range of at least 0.7 g/ml is a density that was calculated for the zirconium hydroxide media layer material commercially available from Magnesium Elektron, Inc., using a tamping technique. The zirconium hydroxide media layer material commercially available from Magnesium Elektron, Inc., was added to a graduated cylinder and the cylinder was knocked or tapped, sometimes referred to as tamping, until the powder reached a constant volume in the cylinder. The density of the material increases as the material packs down. The density upon tamping is at least about 0.7 g/ml and may range from about 0.7 g/ml to about 0.9 g/ml, and in particular, is about 0.8 g/ml. This density range is believed to be applicable across the LOI range of the zirconium hydroxide media layer material commercially available from Magnesium Elektron, Inc. The density of this material within a device could be higher than the data quoted above since the addition of the media in slurry form to the device, or the presence of water during treatment, will aid in the packing of the product. To this end if one slurries the zirconium hydroxide media layer material commercially available from Magnesium Elektron, Inc., in equal parts water and powder, then dewaters the slurry on a Buchner funnel with suction, the material has a density of about 1.0 g/ml, and which may range from about 0.9 to about 1.2 g/ml. It is recognized that in the process of slurrying of the zirconium hydroxide media layer material commercially available from Magnesium Elektron, Inc., the LOI or moisture content will be changed. It is also recognized that this material will have a higher density if pressure is used in the loading of the device or in this case the Buchner funnel. If the zirconium hydroxide media layer material commercially available from Magnesium Elektron, Inc., is dried the physical nature of the material is changed and its density will increase. Density measurements are affected by an inability of the media to flow well. Adding the zirconium hydroxide media layer material commercially available from Magnesium Elektron, Inc., to a 100 ml graduated cylinder to the 100 ml mark, and determining the weight of the powder, results in a density of about 0.5 g/ml. The density measured in this way may range from about 0.4 to about 0.6 g/ml.

The zirconium hydroxide media layer material commercially available from Magnesium Elektron, Inc., or other suitable media is used in a layer having an aspect ratio of at least 10:1. The layer may be planar or it may be in other shapes such as generally cylindrical. The media layer may be disposed on one porous layer such as filter paper of porous plastic, or sandwiched between such porous layers. A cartridge may comprise the porous layer in a generally cylindrical shape with a flat side wall. A cartridge may comprise the porous layer in a generally cylindrical shape with a side wall which has a configuration that increases its surface area, such as folds or pleats.

A suitable titanium hydroxide material is that which may be used in a device employing a layer with an aspect ratio of at least 1:1, and preferably, at least about 10:1. Suitable titanium hydroxide media materials are those disclosed in U.S. Pat. No. 5,618,437, Example 4; U.S. Pat. No. 3,332, 737, Example 1; and Tanaka et al., Adsorption and Desorption Method for Cacodylic Acid with Inorganic Ion Exchangers, Applied Organometallic Chemistry, 4, pp.205–212 (1990), in all cases eliminating any disclosed drying steps in production of the material.

Referring to FIGS. 1 and 2, one embodiment of the present invention is a water treatment device 10. The assembly comprises an outer casing 12 with a water inlet 14. The casing has a head portion 16 interiorly threaded at 18. A cover 20 has an exteriorly threaded portion 22 adapted to engage the threads of the head portion. The cap includes a water outlet 24. The water inlet 14 may be suitably coupled to a water line under the sink, while the water outlet 24 may be coupled to a faucet for direct use as drinking water.

As seen in FIG. 2, the device 10 includes a cartridge 25 which includes an interior, generally cylindrical perforated support 26. Although the support may be formed of a variety of materials having regularly spaced openings, such as perforated metal, in this assembly it is plastic mesh. A generally cylindrical inner layer of porous material 28 completely covers the outer periphery of the interior support. A thin layer of the media 30 of uniform thickness having an aspect ratio of at least about 10:1 covers the inner layer of porous material. A generally cylindrical outer layer of porous material 32 completely covers the thin layer of media. A generally cylindrical outer support member 34 is disposed around the outer layer of porous material. The outer support member may be made of various materials having regularly spaced openings such as perforated metal but in this assembly is a plastic mesh wrapper.

The media may be charged into the cartridge by applying a paste of the media to the inner layer of porous material 28. The zirconium hydroxide media described above and in the examples hereafter may be applied to the inner layer of porous material alone without addition of water, or may be mixed with suitable binding agents and then applied. The paste may be applied using a spatula or in mass production using a doctor blade machine which applies a uniform layer of the media to the inner porous layer. The inner layer of porous material with applied thin layer of media is wrapped around the interior support 26. The outer layer of porous material is then wrapped around the media. The exterior support is then disposed around the outer layer of porous material.

End caps 36 formed of silicon rubber or other suitable material, may be molded directly onto the ends of the subassembly described thus far. When the silicon rubber sets, it captures the media, porous membranes and mesh therein. This provides a seal on both ends of the device to ensure that untreated water does not commingle with treated water. One example of a suitable silicon rubber is GE Silicones™ RTV60 brand silicon rubber adhesive, which is a two pack system that is mixed in equal parts and allowed to set in a mold. An O-ring seal R is disposed between the cartridge 36 and cover 20 to prevent leaking of water. The O-ring is made of any suitable material such as neoprene. In assembly, the cartridge is placed in the casing, and the cover is screwed into the interiorly threaded portion of the head, creating a seal thereby upon compression of the O-ring and end caps. The upper end cap has an opening 37 formed therein to allow passage of treated water.

To fabricate the cartridge in mass production, a roll of porous material is fed onto a belt as a sheet. Media is spread onto the sheet with a doctor blade apparatus to provide a layer of media of uniform thickness on the sheet. Another porous sheet may be laid over the first porous sheet. The media layer and one or more sheets are cut to size into sections while wet. The sheet sections with sandwiched media layer are rolled while wet onto the interior plastic mesh cylinder 26 of the cartridge subassembly so that its edges meet when wrapped therearound. Suitable binding agents such as agar agar may be added to the media to facilitate forming the layer onto the porous section.

The porous layer may be formed of any suitable porous material that permits passage of water but prevents loss of media therethrough, such as commercial grade filter paper, porous plastic such as polyvinyl chloride ("PVC") or polyethylene. A PVC membrane may be formed by mixing PVC with rice grains and leaching the grains out with HCl, thereby making a porous material. Other suitable membranes include Porvic™ brand porous plastic and Daramic™ brand porous plastic, which has micron sized pores.

Figure 3:
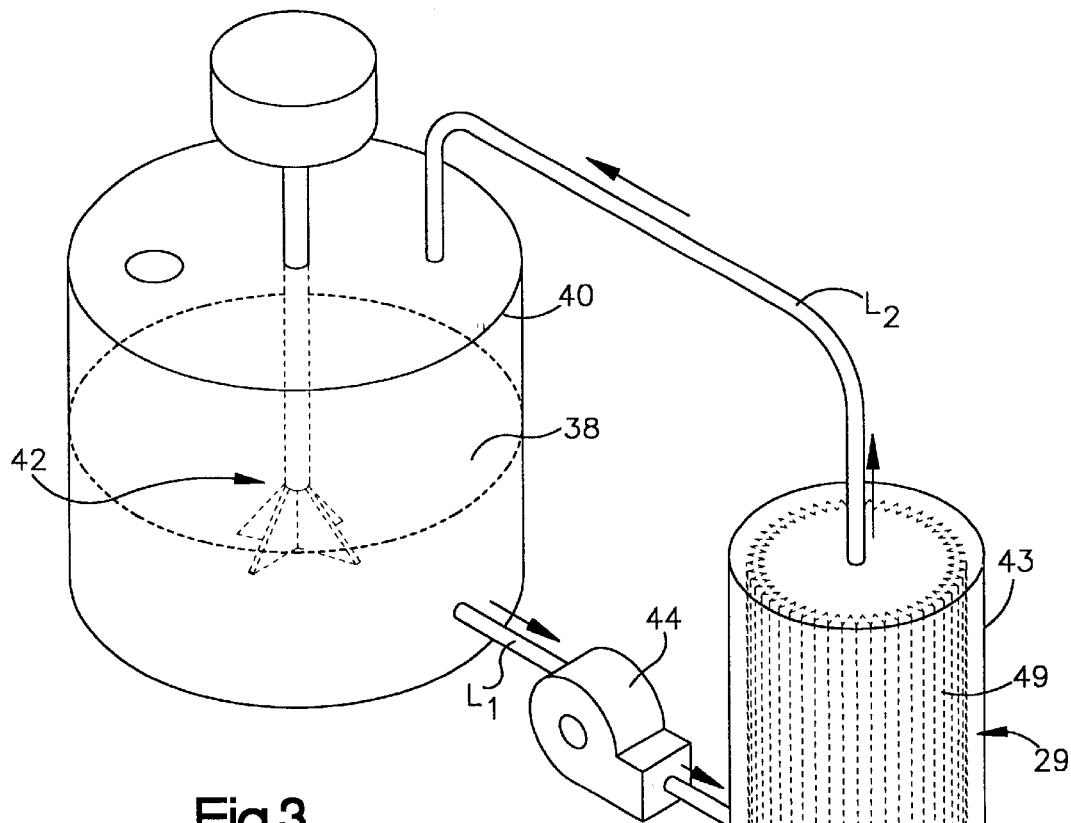
FIG. 3 is a view of an apparatus used to load a cartridge subassembly with a media slurry.

Another way to charge the cartridge with media is to pump in a slurry of the media using the apparatus shown in FIG. 3, so that the media adheres to the inner porous layer 28 wrapped around the interior plastic mesh support 26 so as to form a cartridge subassembly 29 in which the outer porous layer 32, exterior mesh support 34 and end caps 36 have not been added. The inner porous layer of the subassembly 29 may take various forms such as the form shown in dotted lines in FIG. 3 discussed hereafter, or the flat cylindrical form shown in FIG. 2. Slurry 38 of the media is stirred in a tank 40 with an agitator 42, and pumped using pump 44 along line $L_1$ in a direction shown by the arrows into a vessel 43 containing the cartridge subassembly, which may employ seals that prevent the slurry from first contacting the interior of the porous layer. Excess water passes through the media to the interior of the cartridge subassembly 29, back to the tank through line $L_2$. After a desired amount of media has been deposited onto the inner porous layer of the cartridge subassembly, it may then be removed from the vessel and the outer porous layer, exterior support and end caps may be positioned to form the cartridge 25.

Yet another way to charge the cartridge with media is to pump a slurry of the media onto a porous layer wrapped around the inner support member of the cartridge subassembly 29 in the vessel 43. The porous layer with deposited media may then be trapped in the silicon rubber end caps so as to be sealed at both ends. The outer porous layer 32 and exterior support 34 need not be used in this form of cartridge. The cartridge would be placed in the casing 12 and secured with the cover 20 as described above in connection with FIG. 1. The device with this form of cartridge is preferably run under pressure. The media would constantly be kept wet, and not drained or allowed to dry out.

This unit may be loaded with, for example, about 10 pounds of media, and may treat water at 1–5 liters of water per minute depending upon the water pressure. Similar to use of domestic water purifiers, the device shown in FIGS. 1 and 2 (as well as the device of FIGS. 4 and 4A) may be attached to a tap on a water line under the sink, for example. A new cartridge is easily inserted by unscrewing the cap and replacing the spent unit.

Another form of cartridge according to the present invention may fill the media into a bag (not shown), having a cylindrical, square or other shape when filled. The bag may be formed of sections that are connected together after filling, suitable bag materials being filter paper, Porvic™ brand porous plastic, filter cloth such as Microfiber™ brand polyester, and the like. The pore size of the porous layers or bags which contain the media, is preferably less than 1 micron for media having an average particle size ranging from 1–5 microns. In all embodiments of this disclosure suitable average particle sizes of the media and pore sizes of the bags and other porous layers would be apparent to those skilled in the art in view of this disclosure. A plurality of media bags may be used, each bag being supported on a porous plastic tray, plastic mesh or the like. The bags are arranged in series or parallel depending upon the application.

Figures 4, 4A:
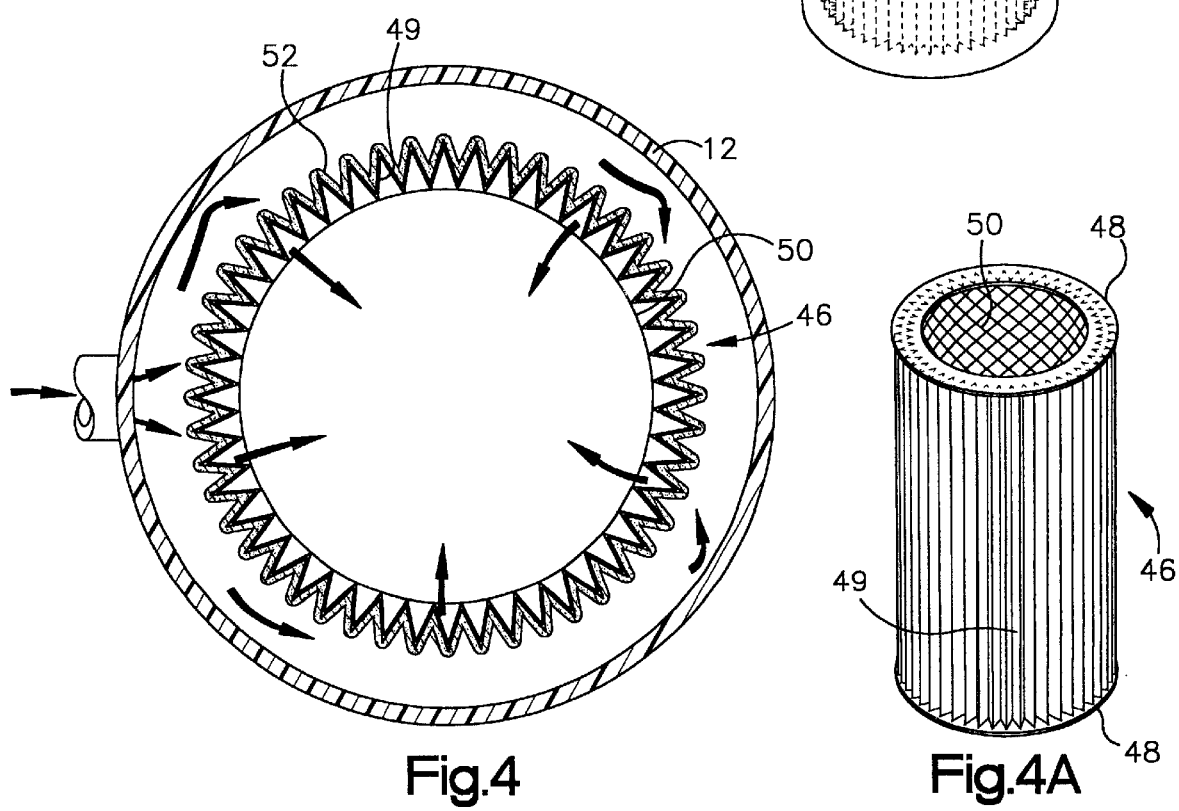
FIG. 4 is a cross-sectional view of another device constructed in accordance with the present invention.
FIG. 4A is a perspective view of a cartridge used in the device of FIG. 4.

Another embodiment of the present invention employs a cartridge 46 with a pleated configuration as shown in FIGS. 4 and 4A. The cartridge 46 may be used in place of the cartridge 25 in the device 10. The cartridge employs upper and lower annular polymer end plate seals 48 made from GE Silicones™ RTV60, which trap the filter paper and deposited media, at each end of the cartridge. A porous layer 49 is disposed around an interior mesh support 50. A star-shaped configuration of cartridge is shown in FIGS. 3 and 4 as seen without the polymer end plates. A layer of media 52 is deposited on the outside of the porous layer 49. The porous layer may be formed of paper or plastic such as commercial grade filter paper or Porvic™ brand porous plastic.

The porous layer 49 may be formed, for example, of about 50 folds each about 2.5 inches in depth. This design employed a cartridge 5 inches high and 2.5 inches in diameter, had a surface area of about 4500 inches$^2$ and used about 10 pounds of zirconium hydroxide media. The media layer thickness for the cartridges shown in FIGS. 1, 2, 4 and 4A was about ⅛ to ¼ inch. Using cartridges of greater surface area advantageously enables lower inlet water pressures to be used. For example, at a pressure of 15 pounds per square inch gauge (psig), this unit may treat about 60–70 gallons of arsenic contaminated water per minute using 10 pounds of media. The aspect ratio of the household cartridge shown in FIGS. 1 and 2 was 156.8:1 (5 inches high×2.5 inch diameter=39.2 in.$^2$; 39.2 in.$^2$/0.25 inch. media layer thickness). The aspect ratio of the cartridge shown in FIGS. 4 and 4A was 18,000:1 (18 inches high×5 inch diameter×50 pleats=4500 in.$^2$; 4500 in.$^2$/0.25 inch media layer thickness). Other variations of this design would be apparent to one skilled in the art in view of this disclosure, such as a different number or depth of folds, or overall shape of the porous layer. The cartridge assemblies of the present invention may be scaled up or down in size as needed, and may be run either in series or in parallel depending upon the desired treatment volume.

The units may be regenerated in situ, for example, by treatment with a solution of sodium hydroxide, which removes the arsenite and arsenate from the media. A small amount of sodium hypochlorite (NaOCl) may be added as it accelerates the removal of arsenite without damaging the media. The regeneration apparatus may employ the equipment shown in FIG. 3. The regeneration solution is pumped into the media either countercurrent or in the the direction of flow and into the cartridge. The regeneration solution would be circulated to a secondary tank until all of the arsenic had been removed from the media.

Figure 5:
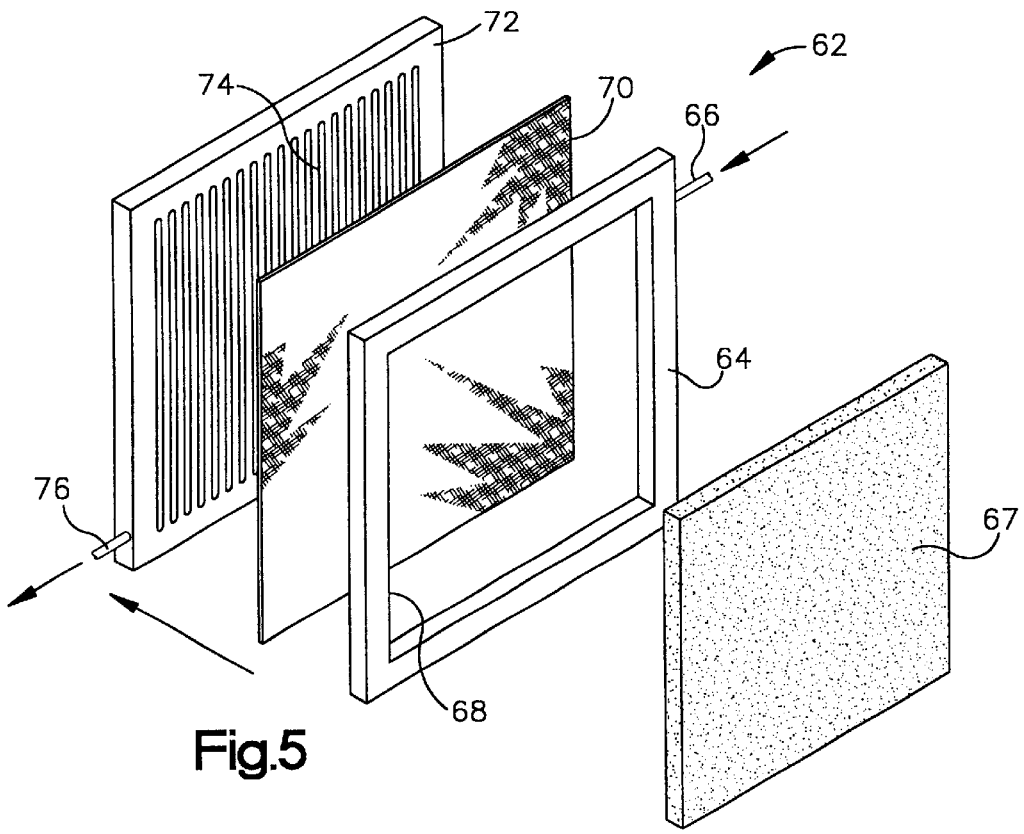
FIG. 5 is a perspective view of a set of press members loaded with a layer of media for use in a filter press, in accordance with the present invention.
Figure 6:
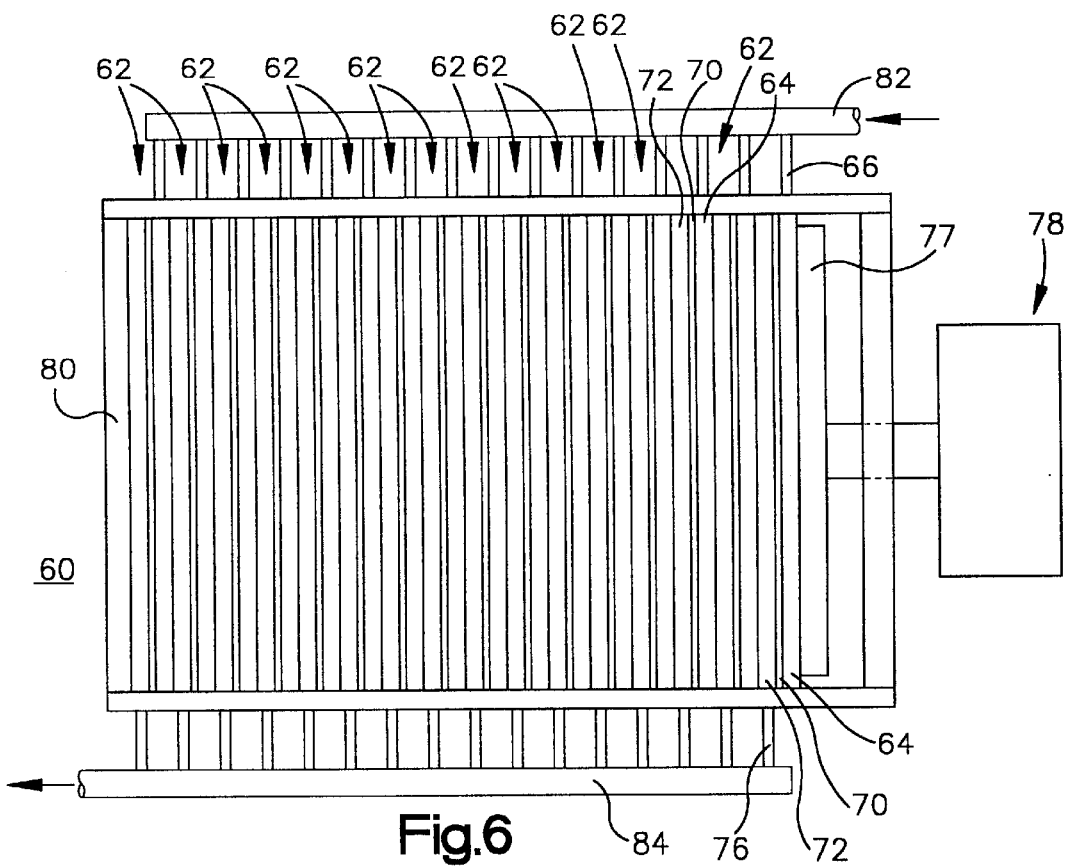
FIG. 6 is a schematic view of a filter press used in accordance with the present invention.

Yet another embodiment of the present invention is directed to use of a filter press 60 to treat water, portions of which are shown schematically in FIGS. 5 and 6. This aspect of the present invention is suitable for use with known filter presses, such as plate and frame type filter presses. One example of a suitable filter press is the prior art filter press disclosed in U.S. Pat. No. 4,222,873, which patent is incorporated herein by reference in its entirety. Another suitable filter press is a Netzsch™ brand filter press as disclosed over the Internet at http://netzschusa.com/FilterPress/FilterPressmain.htm, dated Jan. 3, 2000, the contents of which is expressly incorporated herein by reference in its entirety.

The filter press comprises a plurality of filter member sets 62 each including a hollow frame member 64 with a water inlet tube 66. A thin layer of media 67 is disposed so as to obturate a central opening 68 of the frame, at a thickness, for example, of about ¼ to ½ inch. In prior art filter press operation in which no media is employed, a filter cake would form in the frame. A filter cloth 70 is disposed adjacent the frame so as to obturate the central frame opening 68 and prevents the media from going past it in a direction of water travel shown by the arrows in FIG. 5. Arsenic containing water passes through the media and treated water passes from the filter cloth to a back plate 72 formed with indentations 74 such as grooves therein. The grooves permit treated water to flow from the cloth toward an outlet tube 76 which extends from the back plate and communicates with the grooves. The grooves connect to the top and bottom grooves so that all channels are interconnected and feed the exit tube. The back plate may be made of a suitable material such as wood or plastic, with due regard in the selection of back plate material to the effect of contact with the caustic regeneration solution.

The frame, filter cloth and back plate of each set of frame members are pressed together and water flows through the sets in parallel in a filter press shown schematically in FIG. 6. The frames, filter cloths and plates are supported and moved in a known manner. A pressure plate 77 of a hydraulic ram 78 presses the filter member sets against an end plate 80. An inlet pipe 82 for untreated water extends the length of the filter press and is interconnected to the individual water inlet tubes 66 which lead to each frame member. A water outlet pipe 84 for treated water extends the length of the filter press and is interconnected to the individual water outlet tubes 76 which lead from each back plate 72.

It will be understood that the filter press of the U.S. Pat. No. 4,222,873 patent may be modified for use in the present invention as described herein. The filter press may be formed with different numbers of components, for example, 40 sets of frames, filter cloths and plates, each set including a water inlet tube and water outlet tube, and so as to operate in parallel.

The filter press may be charged with the media by pumping a slurry of the media through the water inlet pipe, in parallel into each inlet tube and into each of the frames when the frame sets are pressed together and sealed under pressure by the hydraulic ram assembly. Water is removed from the end plate while the charging is carried out. Once the desired thickness of media has been charged into the frame onto the filter cloth, the pumping of the slurry is stopped.

The filter press may be regenerated by passing a solution of sodium hydroxide into the press in the same direction as the untreated water flows when the device is treating water. In addition, the frames members may be separated from the other components of the filter member set, and the media may be replaced as needed.

Bags containing the media with fabric may be used instead of direct application of the media onto the filter cloth. The media bags may be attached to the filter cloth as by quilting or the like. When desired, the bags may be regenerated as in the case of the media applied directly to the frame, or the bags may simply be removed and replaced. The inventive use of the filter press enables large volumes of water to be treated. For example, the surface area of each plate may be about 1600 to about 2400 in.$^2$ and each press may treat about 700 gallons of water per minute. Filter presses may be ganged up and used in parallel and may conceivably treat the water of an entire city. The treated outflow would be continually tested to ensure that the arsenic content does not exceed acceptable levels.

Figure 7:
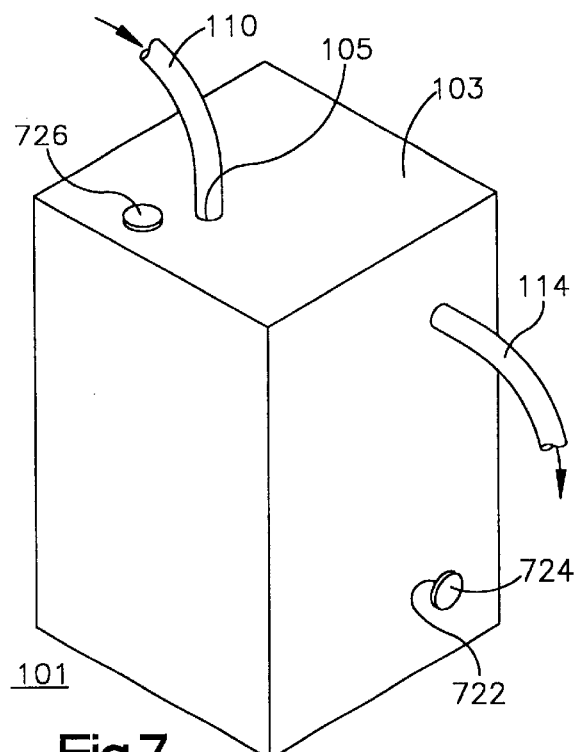
FIG. 7 depicts an apparatus constructed in accordance with the present invention.
Figure 8:
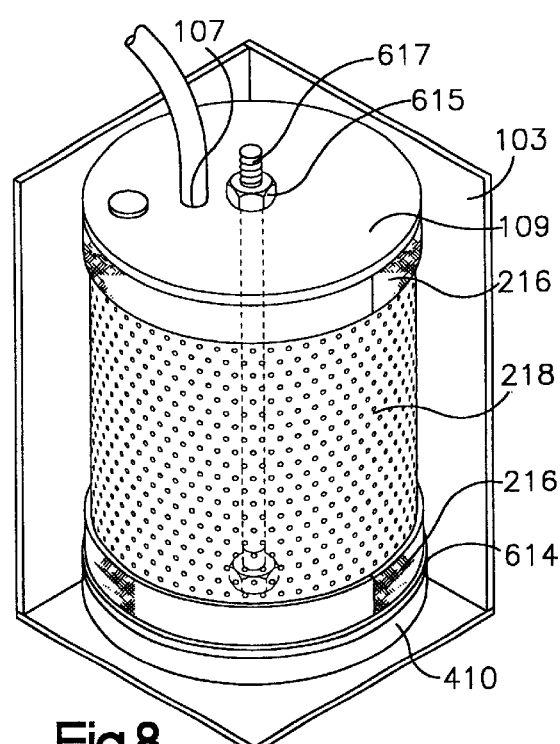
FIG. 8 depicts the apparatus shown in FIG. 7 where the sealed tank has been cut away to show the objects inside of it.
Figure 9:
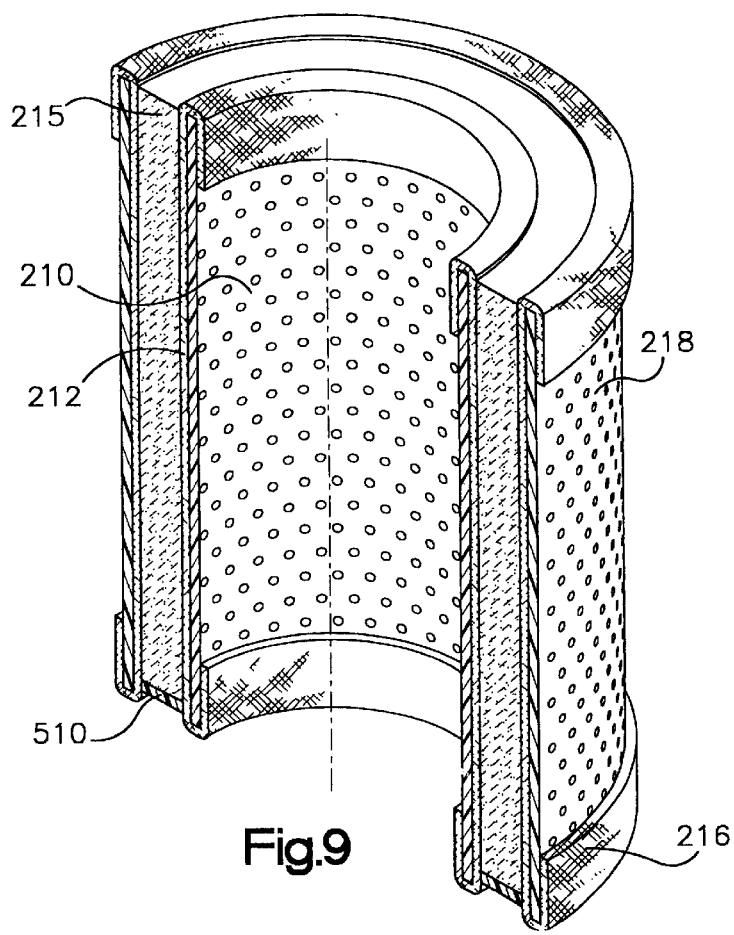
FIG. 9 depicts a vertical cross section of inner and outer canisters combined with inner and outer cloth cylinders.

An apparatus 101 for removing toxic ions from a contaminated solution is shown in FIG. 7. Contaminated water flows into the apparatus by input line 110. Input line 110 can be connected to, for instance, a well pump. Input line 110 can be constructed of a clear plastic tubing so that the operator of the apparatus can see the amount of solution in the input line. Input line 110 enters tank 103 through tank hole 105. Input line 110 can be held in place with the use of adapters, tubing clamps and the like. As shown in FIG. 8, once inside the apparatus, input line 110 is attached to lid 109 at lid hole 107. Lid hole 107 is positioned so that the contaminated solution passes from input line 110 into the inside of inner canister 210 ( a cross section of inner canister 210 and outer canister 218 is shown in FIG. 9). The contaminated solution passes through permeable inner canister 210, through a semi-permeable (permeable to water but substantially impermeable to the zirconium hydroxide) inner cloth cylinder 212, and through an inter-canister space 215 which holds a zirconium hydroxide media. While the contaminated solution is passing through the inter-canister space, the toxic ions are removed from the solution by the zirconium hydroxide media. The solution, now substantially free of toxic ions or species, passes through a semi-permeable outer cloth cylinder 216, through the permeable outer canister 218, and out of the device through the output flow line 114. Output flow line 114 can be held in place with the use of adapters, tubing clamps and the like. The inner and outer cloth cylinders (212, 216) are substantially impermeable to the zirconium hydroxide media (with or without toxic ions attached), trapping the zirconium hydroxide media in inter-canister spate 215.

The walls of inner and outer canisters 210 and 218 are permeable such that liquid solutions can easily and evenly move through the walls. This can be achieved, for example, by placing evenly spaced holes in the sides of the walls of the canisters. The water or contaminated solution should move through the walls of the canisters uniformly, e.g., there are no areas in the walls which are more permeable than others.

Each of the canisters is individually lined on one side with a semi-permeable cloth cylinder so that the outside of inner canister 210 is covered with inner cloth cylinder 212 and the inside of outer canister 218 is covered with outer cloth cylinder 216.

The cloth cylinders may be made from fabric bought at a fabric store. For example, a fabric which is a blend of 65% polyester/35% cotton can be used. The fabric needs to be permeable to water and substantially impermeable to zirconium hydroxide. The construction of cloth cylinders 212 and 216 is shown in FIGS. 10A–10G. The first step is the same for both cloth cylinders. Cloth 310 is sewn into a cylindrical shape by folding the fabric over and sewing a first seam 312 down the side of the fabric with the raw edges 314.

Figure 10A:
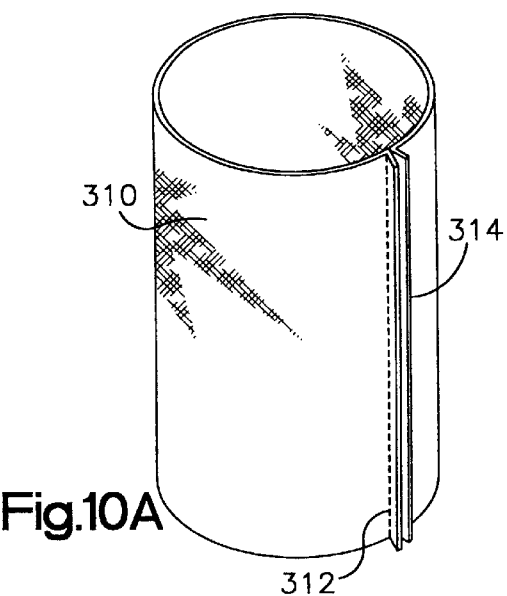
FIGS. 10A, B, C, and D depict the construction of the outer cloth cylinder and its application to the outer canister.
Figure 10B:
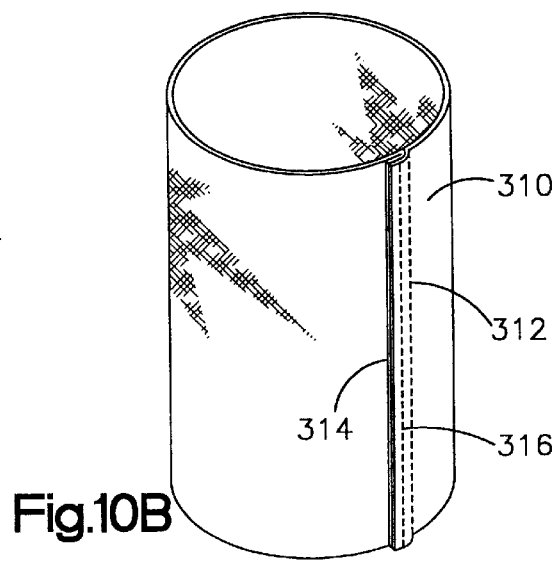
FIGS. 10E, F, and G depict the construction of the inner cloth cylinder and its application to the inner canister.
Figure 10C:
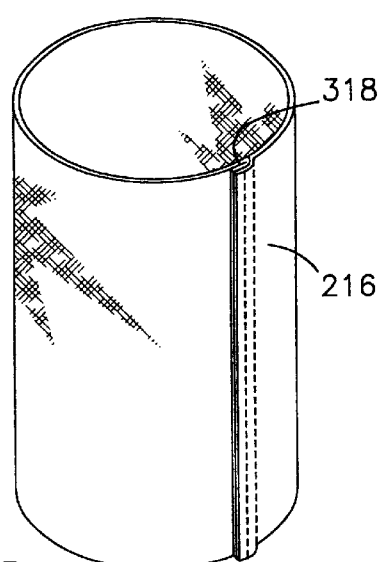
Figure 10D:
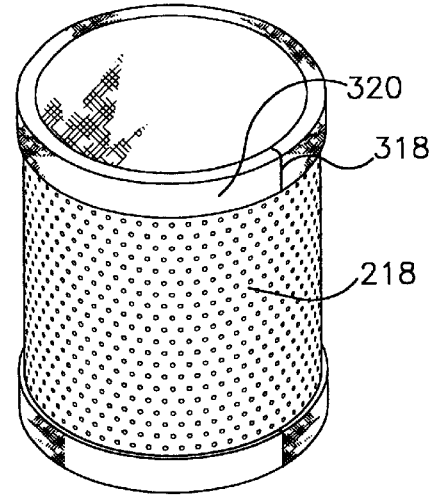
Figure 10E:
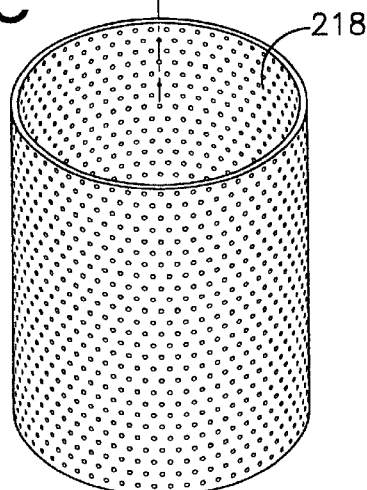
Figure 10G:
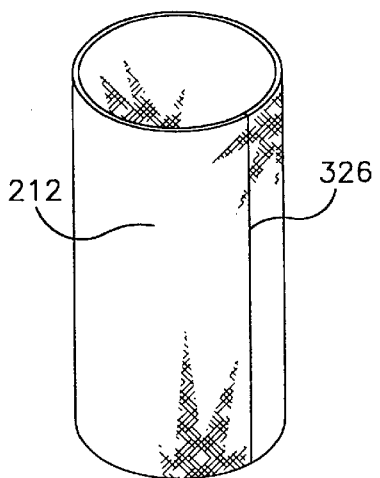
Figure 10G:
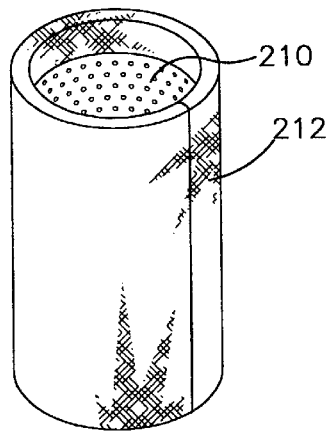
Figure 10F:
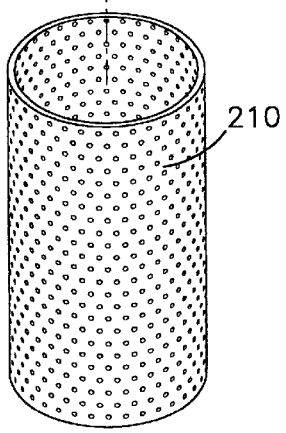

For the outer cloth cylinder, the edges of first seam 312 are then folded over and sewn down against one of the sides of the cloth 310 (as shown in FIG. 10B). This second seam 316 adds strength to the cloth cylinder and prevents loose threads from coming loose and fraying. The two seams (312 and 316) together are commonly referred to as a Flat Felled seam 318. Outer cloth cylinder 216 may now be turned inside out and slipped inside the outer canister 218 so that the Flat Felled seam 318 is against the inside of outer canister 218. The cloth for outer cloth cylinder 216 is approximately equal to the circumference of the outer canister 218 plus ¼ of an inch. This extra circumference length facilitates the folding of the top and bottom edges of outer cloth cylinder 216 over the outside edges of outer canister 218. As demonstrated in FIG. 10C, outer cloth cylinder 216 is slipped inside outer canister 218. Then, the top and bottom edges of the outer cloth cylinder (320, 322) are folded over the sides of the outer canister so that about 1–2 inches of cloth are folded over on both the top and bottom ends of the outer canister. See FIG. 10D.

Inner cloth cylinder 210 can be constructed the same way as outer cloth cylinder 216. However, since the inner cloth cylinder 212 should have a circumference that is approximately the same as the circumference of the smaller metal canister 210, the smaller circumference of the inner cloth cylinder 212 may necessitate the use of a different stitching technique called a French seam. As described above, cloth 310 is first sewn into a cylinder with a first seam 312. Then, the edges of the first seam 312 are cut back so that there is a smaller edge (~¼ an inch). Next, the cloth 310 is turned inside out and a second seam 324 is sewn so that the first seam 312 is enclosed by second seam 324 and stops any fraying from first seam 312. See FIG. 10E. First and second seams 312 and 324 are collectively referred to as French seam 326. Inner cloth cylinder 212 can now be slid over the inner canister 210 so that the French seam 326 is against the outside of inner canister 210. See FIGS. 10F and 10G. The seams in the inner and outer cloth cylinders may be arranged so as to touch the inner and outer canisters or so as not to touch them.

Figure 11:
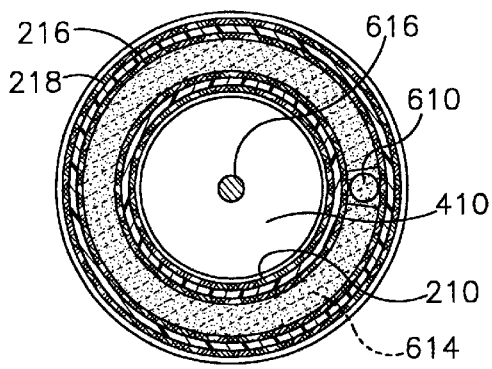
FIG. 11 depicts a view of the base and the areas where the rims of the inner and outer canisters would sit on the base.
Figure 12A:
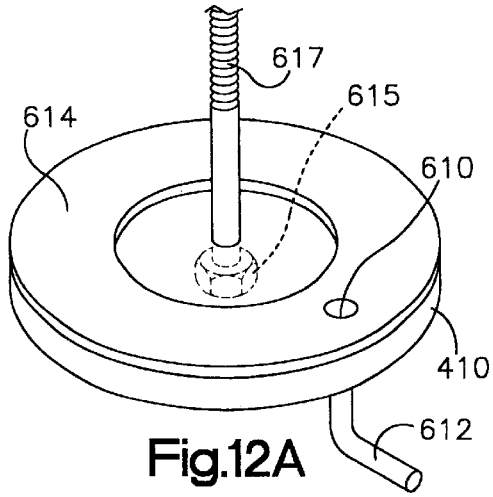
FIGS. 12A and B show the base and the washer which sits on top of the base.
Figure 12B:
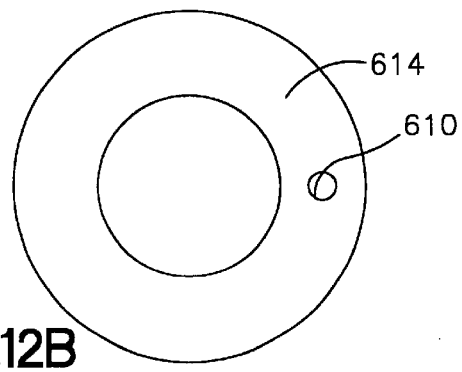
Figure 13:
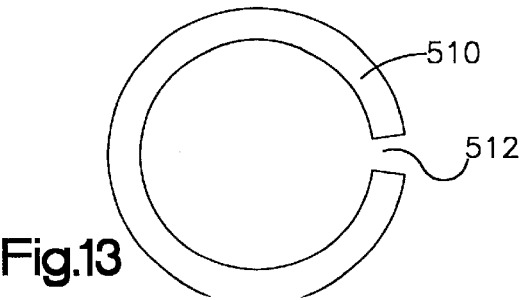
FIG. 13 depicts an example of an annular spacer used in the apparatus.

Inner canister 210, covered by inner cloth cylinder 212, is now set on a plastic base 410. FIG. 11 depicts with dotted lines approximately how the inner and outer canisters are situated on the base. Outer canister 218, with the outer cloth cylinder 216 covering the inside, is set on base 410, outside of inner canister 210. An annular spacer 510 is placed between the inner and outer canisters (210, 218) so that the radial distance between the inner and outer canisters (210, 218) is equidistant throughout. See FIGS. 9 and 13. Spacer 510 can be made of any suitable material, such as, for example, rubber. Spacer 510 can optionally have a gap 512 in a sector to facilitate the later draining of used zirconium hydroxide media 214 from the region between the inner and outer canisters.

Base 410 can have a hole 610 which can be fitted with a spigot 612. Hole 610 should be located in base 410 so that it is under inter-canister space 215. During regular operation, spigot 612 will be closed. After the zirconium hydroxide media 214 has become saturated with toxic ions, the zirconium hydroxide media 214 can be drained out of the apparatus through spigot 612 and replaced with fresh media.

Washer 614 sits on top of base 410 between base 410 and canisters 210 and 218. Base 410 has a bolt hole 616 in its center for bolt 617. Bolt 617 runs horizontally through the center the apparatus, inside of inner canister 210. When bolt 617 is screwed down from the bottom of base 410 and lid 109, bolt 617 pulls the walls of canisters 210 and 218 down against washer 614, preventing any leakage of the zirconium hydroxide media.

Figure 14:
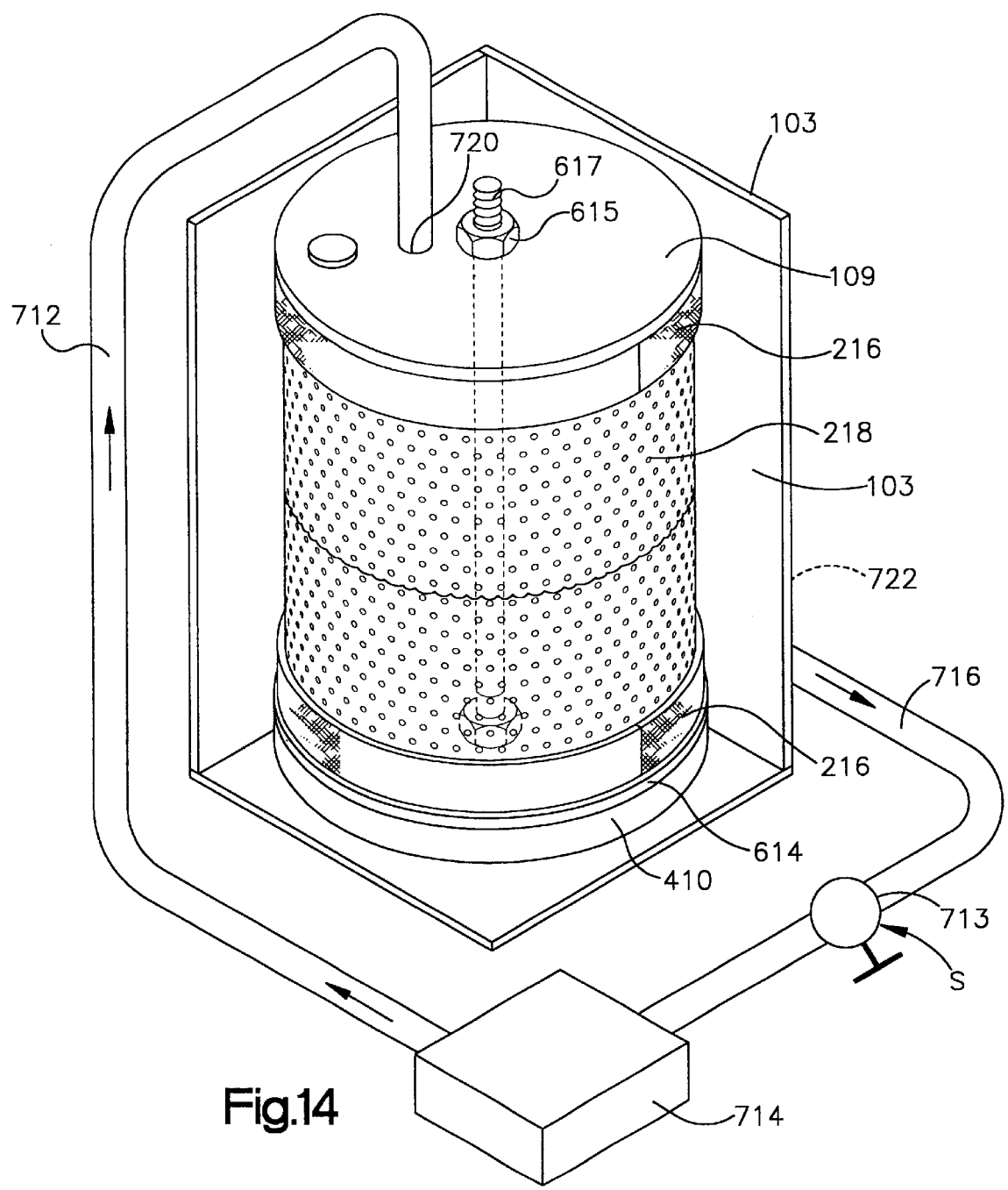
FIG. 14 depicts the apparatus as zirconium hydroxide media is being loaded into the inter-canister space.

Once the pieces of the apparatus have been constructed, the zirconium hydroxide media can be loaded into the apparatus. As demonstrated in FIG. 14, before any zirconium hydroxide is added to the space between the inner and outer canisters, the apparatus is set into tank 103. A mixture of zirconium hydroxide and water that makes a pumpable slurry S can enter the system at media input valve 713, then proceeding to pump 714 where it is agitated or stirred up. Loading input line 712 enters lid 109 through loading input hole 720. Loading input line 712 feeds the mixture of agitated zirconium hydroxide and water into inter-canister space 215. The zirconium hydroxide in the mixture gradually settles into the bottom of the inter-canister space, displacing water which flows over the top of the canisters and out through the water permeable walls of outer cloth cylinder 216 and outer canister 218 and into the bottom of tank 103. From the bottom of tank 103, the water/zirconium hydroxide mixture enters the loading output line 716 through loading output hole 722. Loading output line 716 feeds the mixture back to pump 714 which keeps the mixture agitated. The mixture circulates back through pump 714 to input line 712. The level of zirconium hydroxide in inter-canister space 215 can be monitored as it rises because it is visible from the outside of outer canister 218. Additional zirconium hydroxide and water mixture can be added through media input valve 713 as needed. Once the level of zirconium hydroxide rises to the top of inter-canister space 215, loading input line 712, loading output line 716, and pump 714 can be disconnected from the apparatus. Loading output hole 722 and loading input hole 720 can be closed off during regular operation with caps 724 and 726 (shown in FIG. 7).

It is important that the zirconium hydroxide in apparatus 101 not be loaded by simply pouring dry zirconium hydroxide into inter-canister space 215. If a dry pouring method is used, the zirconium hydroxide crystals condense together, leaving gaps and spaces in inter-canister space 215. It is also important that the zirconium hydroxide in the inner-canister space 215 remain moist throughout its use in the apparatus. If the zirconium hydroxide becomes desiccated, it loses its efficacy. As shown in FIG. 7, output line 114, which carried the decontaminated water out of the apparatus, is located high enough on tank 103 so that the level of water in tank 103 remains above the zirconium hydroxide in inter-canister space 215. Not only does this ensure that the zirconium hydroxide does not dry out, it also ensure that the flow of water from the inner canister through the inter-canister space and out of the outer canister remains uniform over the surface of the canisters. This uniform flow ensures that the zirconium hydroxide media slowly becomes saturated with toxic ions and prevents smaller regions of the media from becoming saturated before others.

As described above, once the zirconium hydroxide becomes saturated with toxic ions, it can be drained out of the inter-canister space by opening spigot 612.

After the used zirconium hydroxide is drained out, the apparatus can be reloaded with fresh zirconium hydroxide by the same method described above.

It is preferred that the materials used to construct the apparatus be suitable for contact with drinking water, such as poly vinyl chloride (PVC), polyethylene, glass, stainless steel, galvanized metal and the like.

The size of the apparatus, and the canisters used in it, can vary depending on the particular use. The smaller the total surface area of the canister walls, the more pressure will be needed to keep the contaminated solution flowing through the apparatus. Additionally, the surface area of the apparatus can be increased by placing two or more canister units in a single tank. Input line 110 can be connected to the individual canister units with the use of PVC pipes and joints.

In accordance with another embodiment of the present invention, a zirconium hydroxide filter can be constructed with the use of 25 micron filter paper. First, a large length of the filter paper is laid out on a horizontal surface. A uniform layer of hydrated zirconium hydroxide paste is smoothed out on the first half of the paper. The second half of the paper is laid over the first half, sandwiching the zirconium hydroxide layer in between the two layers of filter paper. A permeable canister is laid at one end of the filter paper/zirconium hydroxide sandwich. This permeable canister could be taken from a regular water filter device which can be bought at many hardware stores. The filter paper/zirconium hydroxide sandwich is slowly rolled up around the canister, keeping a uniform layer of zirconium hydroxide between the layers of filter paper. Once all of the filter paper is rolled onto the canister, the bottom and top edges of the filter paper are sealed to prevent the zirconium hydroxide from leaking out. The bottom of the canister is also closed off to force any solution coming in from the top of the canister to flow out through the filter paper/zirconium hydroxide layer. Contaminated water is then passed through the canister, out through the filter and zirconium hydroxide layer and the decontaminated water collected.

The present invention will now be described in terms of the following nonlimiting examples, all of which employed the zirconium hydroxide media layer material commercially available from Magnesium Elektron, Inc., at an LOI ranging from about 48% to about 52% and a density when tamped to a constant volume, ranging from about 0.7 g/ml to about 0.9 g/ml, unless otherwise indicated.

EXAMPLE 1

The present invention is not intended for use in a column. It is intended for use in a layer having a higher aspect ratio than a column. However, as an illustration of the effect of a thin layer of the media a column experiment was conducted. Fifty grams of hydrated zirconium hydroxide was made into a paste containing 40% water. A thin section (5 cm) of this zirconium hydroxide paste was inserted into a column. Two liters of water containing 2 grams of chromium trioxide was passed through the column. The effluent from the column was clear and contained 7 ppb $Cr^{+6}$ ions. The dried zirconium hydroxide from the column was bright yellow to about half its depth and the dividing line between the white unreacted zirconium hydroxide and the yellow reacted material was very sharp. The zirconium hydroxide paste exhibited a surprisingly strong affinity and capacity for oxyanions. In one instance 2 grams of chromate were captured on 50 grams of zirconium hydroxide without any sign of breakthrough. This experiment shows that a small portion of the media in the column, illustrative as a "slice" of the performance of a thin layer, exhibited a 10–100 times improvement in capacity over traditional ion exchange columns.

Comparative Example 1

As a comparative example, 1907 liters of water containing 21 parts per million of $Cr^{+6}$ and other ions such as $Cr^{+3}$, $Fe^{+2}$, $Ca^{+2}$ etc. was pumped through three 18 inch tall and 2.5 inch diameter columns containing 1500 grams of zirconia. The zirconia had been previously converted to bead like particulate by mixing the polyvinyl chloride polymer in a solvent. The column had to be changed at least five times due to break through of the chromium ion. Approximately 40 grams of $Cr^{+6}$ was present in the solution. This chromium ion could have been removed by one pass through 1 kilogram of hydrated zirconium hydroxide.

EXAMPLE 2

A study of the effect of the presence of high concentrations of competing ions on the removal of arsenic was carried out. A small amount of media shown in Table 1 was added to a liter of surrogate water which was spiked with sodium arsenite or sodium arsenate, along with other ions in the amounts shown in the table. The solutions were contacted for about 1 hour in a beaker and stirred with a magnetic stirrer bar. Samples were removed and tested at various dilutions until reliable readings were made. Some samples were sent to a registered laboratory for independent analysis.

In regards to the ratio of arsenite to arsenate that exists in Bangladesh waters we used the data produced by Badger et al., Utility of an Insoluble, On-Demand Oxidant for Analysis in Bangladesh Drinking Water, Affinity Water Technologies, Mt. Prospect, Ill. (1999), which reports that water they have sampled from the region has 70%–90% arsenic [III] and the rest arsenic [V]. The measured electrochemical potential suggests that iron is present in the ferrous form in the dissolved state. Ferrous ions, unlike ferric ions, play no role in oxidizing arsenite to arsenate. Although this method of removing arsenic from water is poor compared to passing the water through a thin bed of the media, it is informative as a screening test as all samples are treated to the same degree of mixing and contact. The following Table 1 shows the results of this test.

TABLE 1

| Sample No. | [Co-ion], mg/l | | | | pH | Media Wt. (g) | [Arsenic] (ppm) | |
|---|---|---|---|---|---|---|---|---|
| | $SO_4^{-2}$ | $HCO_3^-$ | $Fe^{+2}$ | $PO_4^{-3}$ | | | Before | After |
| S1 | 0 | 0 | 0 | 0 | 6.5 | 0.10 | 1.0 | 0.1 |
| S2 | 0 | 0 | 0 | 0 | 7.5 | 0.10 | 1.0 | 0.1 |
| S3 | 0 | 0 | 0 | 0 | 6.5 | 0.20 | 1.0* | 0.1 |
| S4 | 0 | 0 | 0 | 0 | 7.5 | 0.20 | 1.0* | 0.1 |
| S5 | 30 | 1300 | 30 | 30 | 6.5 | 0.20 | 1.0 | 0.1 |
| S6 | 30 | 1300 | 30 | 30 | 7.5 | 0.20 | 1.0 | 0.1 |
| S7 | 0 | 0 | 0 | 0 | 6.5 | 0.20 | 1.0 | 0.5 |
| S8 | 0 | 0 | 0 | 0 | 7.5 | 0.20 | 1.0 | 0.5 |
| S9 | 30 | 1300 | 30 | 30 | 6.5 | 0.20 | 1.0 | 0.5 |
| S10 | 30 | 1300 | 30 | 30 | 7.5 | 0.20 | 1.0 | 0.5 |
| S11 | 0 | 0 | 0 | 0 | 6.5 | 0.02 | 0.1 | 0 |
| S12 | 0 | 0 | 0 | 0 | 7.5 | 0.02 | 0.1* | 0 |
| S13 | 30 | 1300 | 30 | 30 | 6.5 | 0.02 | 0.1* | 0 |
| S14 | 30 | 1300 | 30 | 30 | 7.5 | 0.02 | 0.1 | 0 |
| S15 | 0 | 0 | 0 | 0 | 6.5 | 0.20 | 1.0 | 0.1 |
| S16 | 0 | 0 | 0 | 0 | 7.5 | 0.20 | 1.0 | 0.1 |
| S17 | 30 | 1300 | 30 | 30 | 6.5 | 0.20 | 1.0 | 0.1 |
| S18 | 30 | 1300 | 30 | 30 | 7.5 | 0.20 | 1.0 | 0.1 |
| CS19 | 0 | 0 | 0 | 0 | 6.5 | 0.20 | 1.0 | 1.0 |
| CS20 | 0 | 0 | 0 | 0 | 7.5 | 0.20 | 1.0 | 1.0 |
| CS21 | 30 | 1300 | 30 | 30 | 6.5 | 0.20 | 1.0 | 1.0 |
| CS22 | 30 | 1300 | 30 | 30 | 7.5 | 0.20 | 1.0 | 1.0 |
| CS23 | 0 | 0 | 0 | 0 | 6.5 | 1.18 | 1.0 | 0.1 |
| CS24 | 0 | 0 | 0 | 0 | 7.5 | 1.18 | 1.0 | 0.5 |
| CS25 | 30 | 1300 | 30 | 30 | 6.5 | 1.18 | 1.0 | 0.5 |
| CS26 | 30 | 1300 | 30 | 30 | 7.5 | 1.18 | 1.0 | 0.5 |
| CS27 | 0 | 0 | 0 | 0 | 6.5 | 2.36 | 1.0 | 0.5 |
| CS28 | 0 | 0 | 0 | 0 | 7.5 | 2.36 | 1.0 | 0.5 |
| CS29 | 30 | 1300 | 30 | 30 | 6.5 | 2.36 | 1.0 | 0.5 |
| CS30 | 30 | 1300 | 30 | 30 | 7.5 | 2.36 | 1.0 | 0.5 |

*Concentration as prepared before.

Samples ("S") 1 through 6 show the treatment of 1 liter of pure water containing 1 milligram of arsenite at various pH's with and without much higher concentrations of competing anions. The results show no effect of the competing ions on the rate of reaction or capacity with arsenite as the target anion.

In Comparative Samples ("CS") 19–30, similar tests using activated alumina obtained from Alcan (AA-400G, 22×48 mesh), indicate that even with increasing amounts of material, arsenic removal did not approach that of the performance of the inventive treatment material. In some cases, no arsenic removal was detected until the ratio of alumina media had been significantly increased and the process was carried out at the highest pH. We assume this is where the ionization of arsenite is highest and therefore ion exchange capture by activated alumina is most likely. In contrast, the inventive material had a much higher capture rate.

The performance of arsenate removal (Samples 7–10) indicates that the presence of competing ions even at 3 orders of magnitude higher concentration, did not depress the performance of the inventive media. Samples 11–14 show the effect of reducing the amount of media and the concentration of the target species, with or without interfering anions. This more closely resembles actual field conditions. The last Samples 15–18 were used to remove arsenite, although they used twice the amount of material as samples 1 and 2, 0.2 g instead of 0.1 g.

EXAMPLE 3

Surrogate solutions were prepared to approximate the compositions of three aquifers in Bangladesh, the shallow aquifers at Khulna, Chandina Fm and Madhupur Tract. Ions included in the surrogate water were sodium, potassium, manganese, iron, bicarbonate, sulfate, nitrate, and chloride. All anions were added as sodium salts. All cations were added as chlorides. If the amount of sodium in the surrogate was less than that in the aquifer, sodium chloride was added to make up the difference. The chloride, potassium and sodium concentrations of the surrogates were, where indicated, not adjusted to match that of the aquifer.

The three aquifers simulated in this test were chosen to bracket the range of aquifer compositions typically found in Bangladesh. Khulna has the greatest concentration of impurities, especially bicarbonate, while Madhupur is the purest. Chandina is in the middle, although it has a high nitrate concentration. The following Table 2 lists the concentrations of various ions used in the surrogate solutions.

TABLE 2

| Ion | [Solution A], mg/l | | [Solution B], mg/l | | [Solution C], mg/l | |
|---|---|---|---|---|---|---|
| | Surrogate 1 | Khulna | Surrogate 2 Chandina | | Surrogate 3 Madhupur | |
| $K^+$ | 11.0 | 1.0 | 8.2 | 8.2 | 1.3 | 1.3 |
| $Mn^{+2}$ | 0.64 | 0.64 | 0.25 | 0.26 | 0.23 | 0.23 |
| $Fe^{+2}$ | 2.2 | 2.2 | 4.7 | 4.7 | 0.8 | 0.8 |
| $HCO_3^-$ | 639 | 639 | 449 | 452 | 213 | 213 |
| $SO_4^{-2}$ | 5.0 | 5.0 | 0.4 | 0.4 | 0.6 | 0.6 |
| $NO_3^-$ | 0.40 | 0.40 | 7.4 | 7.3 | 0.3 | 0.3 |
| $Na^+$ | 256 | 256 | 172 | 81 | 81 | 26 |
| $Cl^-$ | 33.2 | 356 | 13.7 | 61 | 2.5 | 2 |
| $AsO_2^-$ | 1.0 | | 0.5 | | 0.5 | |
| pH of water tested | 7.0 | 7.21 | 7.5 | 7.39 | 6.5 | 6.65 |

The surrogate solutions were prepared in several stages. First, a stock solution wag prepared containing all of the ions except bicarbonate and arsenite. Five milliliters of the stock solution were diluted to 1000 ml, and the bicarbonate and arsenite were added. The resultant solution was then divided into two equal portions, both of which were then diluted to 3000 ml. One portion of this test solution was pumped through a column containing 5 g of the inventive media. The other portion was pumped through a column containing 5 g of activated alumina. For solution C only, the arsenite was not added until after the solution, with bicarbonate added, was split into two equal halves. Sodium arsenite was added to one half while sodium arsenate was added to the other. Both halves of this solution were pumped through columns containing 5 g of the inventive media.

The column tests were employed as a means to illustrate the effect of the inventive thin layer with aspect ratio of at least 10:1 . However, the present invention is not for use in a column for actual water treatment. The column would result in insufficiently low flow rates and excessive treatment times.

The columns were prepared by filling a 2.54 centimeter diameter, 15 centimeter long glass column with 5 g of the media. The inventive media filled the column to a depth of about 0.6 cm. For the alumina ion exchange material, the bed depth was about 1 cm. A peristaltic pump was used to circulate the test solution continuously from a reservoir through the column, at a flow rate of about 100 ml/min. Due to compaction of the media, the flow rate varied from about 50 ml/min to 120 ml/min.

Figure 15:
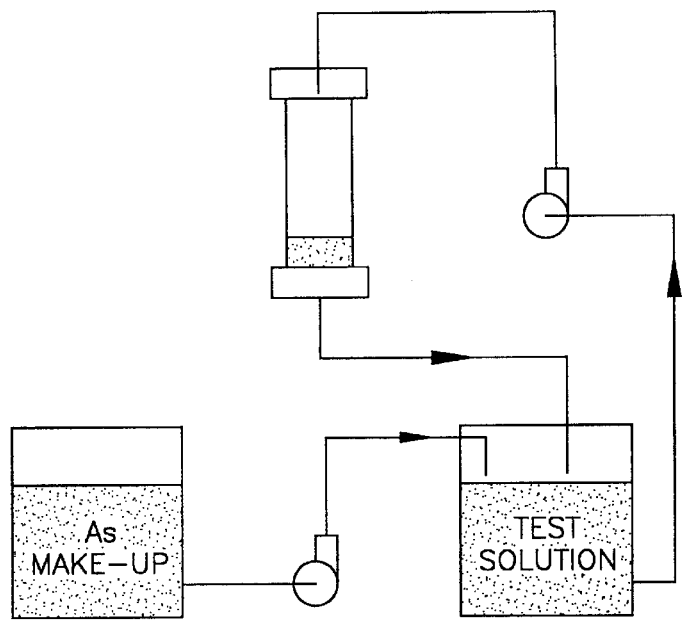
FIG. 15 is a column test set-up referred to in an example herein.

As the surrogate solutions were passed through the column, arsenic that was removed from solution was made up by adding arsenic to the reservoir from a concentrated make-up solution. The concentration of arsenic in the make-up solution was 125 mg/l, and the flow rate of this solution into the reservoir was 0.3 to 0.5 ml/min, so that the rate of arsenic addition to the system was approximately 3 mg/hr. The column test set-up is shown in FIG. 15.

Samples were periodically removed from the system to test for arsenic concentration. Usually, two samples were taken at a time: one from the reservoir to monitor the arsenic concentration at the inlet of the column, and the other from the outlet of the column. The pH was also measured for both samples, and HCl was added to the reservoir as needed to maintain the pH within the desired range (6.5 to 7.5).

Figure 16:
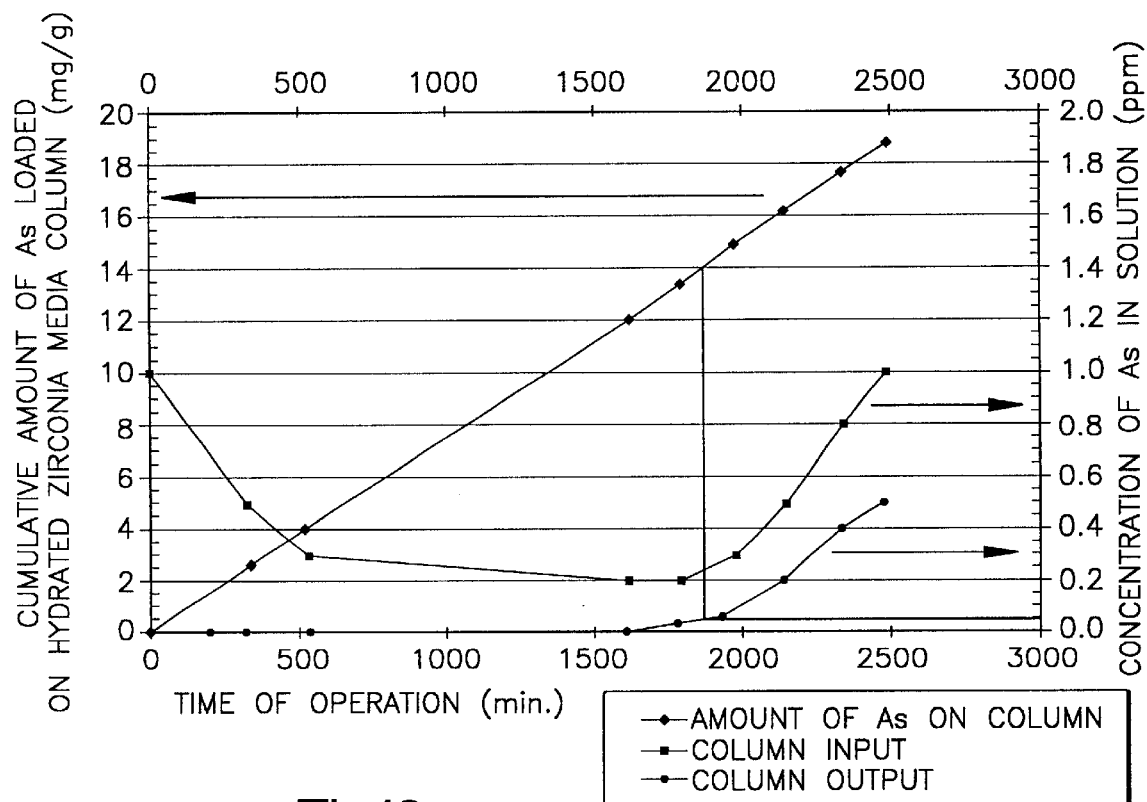
FIG. 16 is a graph of column test results for Khulna surrogate as discussed in an example herein.

The results of this experiment are shown in the following Table 3 in terms of the amount of arsenic retained by the media before the concentration of arsenic in the column outlet exceeded 0.05 ppm. This point was interpolated from a graph of outlet concentration/column retention vs. time of test, as shown in FIG. 16 for the Khulna surrogate/inventive media arsenic [III] test (Sample No. 31). Subsequent figures are for other column test as given in Table 3.

TABLE 3

| Sample No. | Solution | Media (Weight = 5 g[1]) | As Valency | mg As per g of Media[2] |
|---|---|---|---|---|
| 31 | Khulna Surrogate 1 | Inventive | As[III] | 14 |
| 32 | Khulna Surrogate 1 | Activated alumina | As[III] | — |
| 33 | Chandina Surrogate 2 | Inventive | As[III] | 13 |
| 34 | Chandina Surrogate 2 | Activated alumina | As[III] | — |
| 35 | Madhupur Surrogate 3 | Inventive | As[V] | 3.0 |
| 36 | Madhupur Surrogate 3 | Activated alumina (30 g) | As[III] | 0.05 |
| 37 | Madhupur Surrogate 3 | Activated alumina (30 g) | As[V] | 0.4 |

[1]Except where otherwise indicated.
[2]The mg As adsorbed per g of media, when the concentration of As in the outlet of the column was 0.05 ppm.

It appears that the capacity of the inventive media is not greatly affected by the composition of the test solution within the ranges indicated. For inventive media, the amount of As [III] adsorbed on the column was essentially the same for all three surrogate solutions, ranging from 13 mg/g to 15 mg/g. For As [V] the capacity was about 2.5–3 mg/g. For activated alumina, the outlet solution from the column contained more than 0.1 ppm As from the start. The manufacturer recommends a capacity for activated alumina of 1.7 mg/g of As[V].

This example illustrates that, as with Example 2, the oxidation state of the arsenic impacts the retention capacity of the column. The media appears to have about 20% of the capacity for arsenic [V] as for arsenic [III].

Tests using activated alumina as the media showed that alumina failed to be effective under the conditions used here. However, no tests were performed for the alumina/As[V] combination.

EXAMPLE 4

In other experiments with the media it was noted that the actual capacity of the media when input concentration equaled the output concentration was very much higher, as much as 14% by weight for arsenite. This high capacity was confirmed using chromate ion, since it stains the media bright yellow, leaving a sharp line between the yellow saturated media and the white unreacted media.

In this experiment, 1.93 g of chromium trioxide (equivalent to 1 g of chromium) was dissolved in 1 liter of water. This solution was pumped through a small glass column loaded with 20 grams of the inventive media. The deeply stained media and the unreacted media were separated and weighed. The colored portion weighed 13.6 g, equivalent to a 14.2% capacity. We confirmed the capacity was similar for arsenite and arsenate using much more concentrated solutions once we had a target concentration to work with the chromium experiment.

Although we cannot use the full capacity of the media, since the ability to reduce concentrations below our target of 5 ppb declines as the capacity of the media is taken up over time, this extra capacity provides a significant margin of safety in the field. We can accept a much lower loading of the material for our design parameters to ensure that during operation no breakthrough occurs. The media will not discharge arsenic at a higher concentration than the feed concentration even when the capacity of the material is completely taken up. Thus, failure to change the cartridge at the end of the recommended period will not put the users in greater jeopardy. As the cartridge approaches its recommended life, there is sufficient extra capacity to significantly reduce the arsenic in the feed stream to give at least twice the life before it will approach the feed in concentration.

EXAMPLE 5

It is desired to design devices suitable for use with tube wells. The inventive media is so reactive that thin bed depths on the order of 1–2 cm are sufficient to strip arsenic by 2 to 3 orders of magnitude. Feed concentrations of 200 ppb are reduced to 1 ppb routinely and for at least 100 days usage. To produce a tubewell device with a head pressure of only a few inches of water, at a flow rate of 8 liters per minute, a large surface area system may be used. The system may employ a layer of material that has an aspect ratio of at least 10:1.

Figure 17:
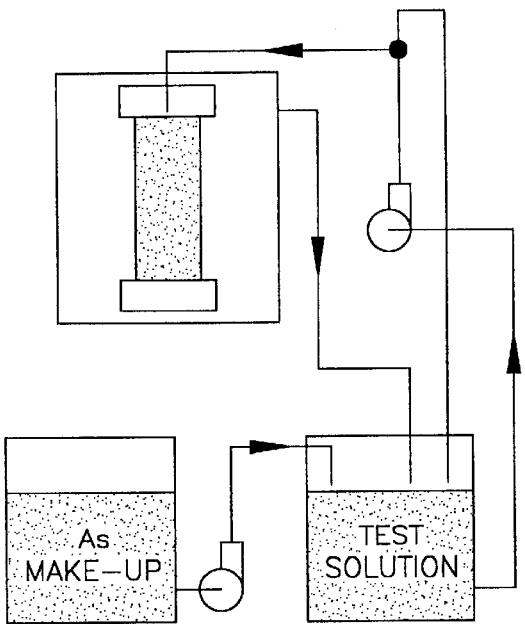
FIG. 17 is a tubewell device setup referred to in an example herein.
Figure 18:
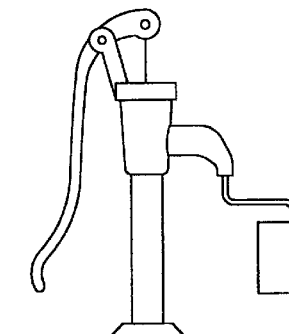
FIG. 18 is a schematic of a water treatment device placed at the output of a tubewell in accordance with the present invention.

A device suitable for use in removing arsenic from a tube well such as in the Bengal Basin, would have following features. There would be a 3 to 6 month operation cycle on hand cranked tube wells delivering about 8 liters of water per minute per well. There would be a dual outlet so that drinking water would pass through a cartridge of the water treatment device to remove arsenic therefrom, while other water used only for cleaning and washing would pass untreated through a bypass. Two pounds of media would last for about 100 days capacity at 200 ppb input and about 1 ppb output. The entire cartridge may be regenerated. There would be no serviceable or removable parts other than the cartridge. The regenerating solution may be 1 Molar NaOH at a pH of about 14. Regeneration may be in-situ, utilizing mobile caustic supply to regenerate 5–10 cartridges per day contaminated with arsenite/arsenate. The solution resulting from regeneration may be returned for treatment and disposal. Alternatively, regeneration may be carried out by replacing the cartridges at the well site with a new cartridge. The old cartridge may be returned to a regional service center for regeneration. The following designs have been tested with surrogate Bengal Basin water on continuous duty. The dimensions and capacities of the devices are shown below. The devices tested for a household application and for use in a tubewell had the configuration shown in FIGS. 7–14. The setup of the tubewell device test is shown in FIG. 17. A pictorial schematic of a tubewell and attached water treatment device is shown in FIG. 18.

TABLE 4

| Application[1]/ (Design #) | Flow rate (l/min.) | O.D. (inches) | Height (inches) | Grams of Media | Volume treated (l) |
|---|---|---|---|---|---|
| Household (1) | 1.0 | 2.25 | 4.25 | 145 | 8,700 |
| Tube well (2) | 8.0 | 12.5 | | 4500 | 270,000 |
| Tube well (3) | 8.0 | 5.00 | 18 | 1100 × 4 | 66,000 |

[1]Each of the above applications had a ¼ inch bed depth.

The results of these tests are provided in the following Table 5.

TABLE 5

| Design # | Input | Concen. (ppb) | % Loading | Volume of Media ($m^3$) |
|---|---|---|---|---|
| 1 | Arsenite | ~200 | 1.5 | 10.8 |
| 2 | Arsenite, Surrogate | ~200 | 1.25+ | 280 |
| 3 | Arsenite (70%) + Arsenate | ~200 | 0.8 | 176 |

All of the devices removed the indicated species to an output level that was below 5 ppb, which was the detection limit of the equipment.

EXAMPLE 6

Figure 19:
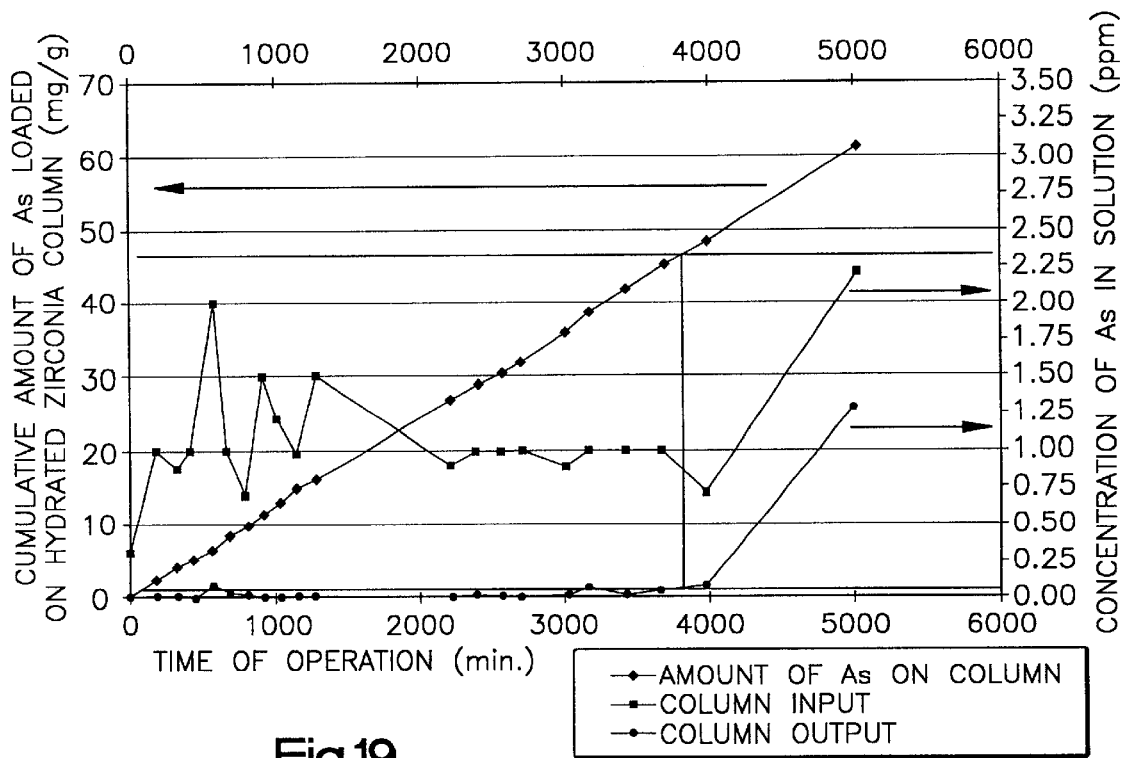
FIG. 19 is a graph showing the results of a column test referred to in an example herein.

A column test was performed to characterize the capacity of the media in the absence of competing ions. The input concentration of As[III] was 1 mg/l. The column was filled with 10 grams of wet media. Arsenic was fed into the system at a rate of about 0.15 mg/min. The results are shown in FIG. 19. Capacity was determined graphically from FIG. 19 at the point at which As in the output of the column exceeded 0.05 mg/l. The data indicates that the capacity for As[III] under these conditions is about 47 mg/g of media. We determined the capacity for As[V] graphically elsewhere according to the present invention, to be 8 mg/g.

The foregoing detailed description of the preferred embodiments of the present invention has been provided for the purpose of illustration and description. It is not intended to be exhaustive or to limit the invention to any of the precise embodiments disclosed. Many modifications and variations to these embodiments will be apparent to practitioners skilled in the art. The embodiments were chosen and described in order to best explain the principles of the invention and its practical application, thereby enabling others skilled in the art to understand the invention.

What is claimed is:

1. A method of treating an aqueous solution, comprising:
    passing the solution into contact with a layer of media having an aspect ratio of at least 1:1, wherein said media comprises a material selected from the group consisting of zirconium hydroxide, titanium hydroxide, hafnium hydroxide and combinations thereof;
    exposing said solution to said media effective to remove therefrom species comprising an $As^{+3}$ component in nonionic form; and
    passing from said media said solution with said species removed.

2. The method according to claim 1 wherein said media is untreated with acid.

3. The method according to claim 1 wherein said $As^{+3}$ component is removed from said solution after a single exposure to said media so as not to be present in an amount greater than about 10 parts per billion.

4. The method according to claim 3 wherein said $As^{+3}$ component is removed to said amount despite a presence of at least one competing species selected from the group consisting of sulphate, phosphate, nitrate, bicarbonate, iron, carbonate, nitrite, silicate, sulphite, chloride, bromide and iodide.

5. The method according to claim 1 wherein said $As^{+3}$ component is removed from said solution after a single exposure to said media so as not to be present in an amount greater than about 1 part per billion.

6. The method according to claim 1 wherein said $As^{+3}$ component is removed directly from said solution without conversion to a species comprising $AS^{+5}$ prior to removal of said $As^{+3}$ component.

7. The method according to claim 1 wherein said solution is groundwater.

8. The method according to claim 1 wherein said solution is delivered from a tube well or from water to a household sink.

9. The method according to claim 1 wherein said media is in a form of a powder having a water content characterized by a loss on ignition of at least 40% when heated at 1000° C. for 1 hour.

10. The method according to claim 8 wherein said media comprises zirconium hydroxide.

11. The method according to claim 9 wherein said media has a density upon tamping to constant volume, of at least about 0.7 g/ml.

12. The method according to claim 1 wherein said media comprises titanium hydroxide.

13. The method according to claim 1 wherein said solution has a pH ranging from about 6.5 to about 7.5.

14. The method according to claim 1 wherein said species comprises a component selected from the group consisting of arsenate ($As^{+5}$), selenate, chromate, borate, perchlorate, fluoride and combinations thereof.

15. The method according to claim 1 wherein said aspect ratio is at least about 10:1.

16. The method of claim 1 wherein said solution is water usable for drinking.

17. A method of treating water, comprising:
    passing water into contact with a layer of media having an aspect ratio of at least 1:1, wherein said media comprises zirconium hydroxide;
    exposing said water to said media effective to remove therefrom species comprising an $As^{+3}$ component in nonionic form; and
    passing from said media said water with said species removed.

18. The method according to claim 17 wherein said media comprises said zirconium hydroxide in a form of a powder having a water content characterized by a loss on ignition of at least 40% when heated at 1000° C. for 1 hour.

19. The method according to claim 18 wherein said media has a density upon tamping to constant volume, of at least about 0.7 g/ml.

20. The method according to claim 17 wherein said media is untreated with acid.

21. The method according to claim 17 wherein said $As^{+3}$ component is removed from said water after a single exposure to said media so as not to be present in an amount greater than about 10 parts per billion.

22. The method according to claim 21 wherein said $As^{+3}$ component is removed to said amount despite a presence of at least one competing species selected from the group consisting of sulphate, phosphate, nitrate, bicarbonate, iron, carbonate, nitrite, silicate, sulphite, chloride, bromide and iodide.

23. The method according to claim 17 wherein said $As^{+3}$ component is removed from said water after a single exposure to said media so as not to be present in an amount greater than about 1 part per billion.

24. The method according to claim 17 wherein said $As^{+3}$ component is removed directly from said water without conversion to a species comprising $As^{+5}$ prior to removal of said $As^{+3}$ component.

25. The method according to claim 17 wherein said water is groundwater.

26. The method according to claim 17 wherein said water is delivered from a tube well or from a source to a household sink.

27. The method according to claim 17 wherein said water to be treated has a pH ranging from about 6.5 to about 7.5.

28. The method according to claim 17 wherein said aspect ratio is at least about 10:1.

29. The method of claim 17 wherein said water is usable for drinking.

30. A method of treating groundwater so as to be suitable for drinking, said method comprising:
  passing groundwater to be treated into contact with a layer of media having an aspect ratio of at least about 10:1, wherein said media comprises zirconium hydroxide, and has a water content characterized by a loss on ignition of at least 40% when heated at 1000° C. for 1 hour;
  exposing said groundwater to said media effective to directly remove therefrom species comprising an $As^{+3}$ component in nonionic form without conversion of said $As^{+3}$ component to a species comprising $As^{+5}$ prior to removal of said $As^{+3}$ component, wherein said removal results in a level of said $As^{+3}$ component that is not greater than 10 parts per billion after a single exposure to said media; and
  passing from said media said water with said $As^{+3}$ component removed.

31. A device for treating an aqueous solution, comprising:
  a housing;
  at least one porous layer constructed and arranged to partition said housing into an untreated solution region and a treated solution region;
  a layer of media having an aspect ratio of at least 1:1 disposed in said untreated region adjacent the at least one said porous layer, wherein said media comprises a material selected from the group consisting of zirconium hydroxide, titanium hydroxide, hafnium hydroxide, and combinations thereof;
  a seal that engages the at least one said porous layer to prevent fluid communication between said untreated region and said treated region other than through the at least one said porous layer;
  an inlet that is adapted to communicate a source of an untreated aqueous solution to said untreated region of said housing; and
  an outlet for discharging a treated aqueous solution from said treated region of said housing.

32. The device according to claim 31 wherein said media is untreated with acid.

33. The device according to claim 31 wherein said media is in a form of a powder having a water content characterized by a loss on ignition of at least 40% when heated at 1000° C. for one hour.

34. The device according to claim 33 wherein said media comprises zirconium hydroxide.

35. The device according to claim 34 wherein said media has a density upon tamping to constant volume, of at least about 0.7 g/ml.

36. The device according to claim 31 wherein said media comprises titanium hydroxide.

37. The device according to claim 31 wherein said inlet is adapted to be fastened to a spout leading from a tube well.

38. The device according to claim 31 wherein said layer of media and the at least one said porous layer are in a generally cylindrical shape.

39. The device according to claim 31 wherein said layer of media is generally planar.

40. The device according to claim 31 comprising a cartridge that is adapted to be removably fastened in said housing, said cartridge comprising said layer of media and the at least one said porous layer.

41. The device according to claim 40 wherein the at least one said porous layer includes a plurality of pleats.

42. The device according to claim 40 wherein the at least one said porous layer is generally cylindrical.

43. The device according to claim 31 wherein said aspect ratio is at least about 10:1.

44. A device for treating an aqueous solution, comprising:
  (a) a plurality of sets of press members each set comprising:
    a hollow frame member including a central opening for passing fluid therethrough,
    a layer of media having an aspect ratio of at least 1:1 disposed so as to obturate said central opening, wherein said media comprises a material selected from the group consisting of zirconium hydroxide, titanium hydroxide, hafnium hydroxide, and combinations thereof,
    a fluid inlet leading to said frame member so as to communicate an untreated aqueous solution to said central opening,
    a back plate having indentations formed therein, said back plate being configured and arranged so as to obturate said central opening,
    a porous layer disposed between said back plate and said frame member so as to obturate said central opening, and
    a fluid outlet leading from said back plate so as to discharge a treated aqueous solution from said back plate;
  (b) support means for supporting and enabling movement of said press members; and
  (c) means for compacting said press members together under pressure so as to form a water tight seal between said press members of each set and between adjacent sets of said press members.

45. The device according to claim 44 wherein said media is untreated with acid.

46. The device according to claim 44 wherein said media is in a form of a powder having a water content characterized by a loss on ignition of at least 40% when heated at 1000° C. for one hour.

47. The device according to claim 46 wherein said media comprises zirconium hydroxide.

48. The device according to claim 44 wherein said media comprises titanium hydroxide.

49. The device according to claim 47 wherein said media has a density upon tamping to constant volume, of at least about 0.7 g/ml.

50. The device according to claim 44 wherein said aspect ratio is at least about 10:1.

51. A method of treating an aqueous solution, comprising:
  passing said solution into contact with a layer of media having an aspect ratio of at least 1:1, wherein said media comprises a material selected from the group consisting of zirconium hydroxide, titanium hydroxide, hafnium hydroxide and combinations thereof;
  exposing said solution to said media effective to remove therefrom ionic species and nonionic species comprising an $As^{+3}$ component in nonionic form; and
  passing from said media said solution in which said ionic species and said nonionic species have been removed.

52. The method according to claim 51 wherein said media is untreated with acid.

53. The method according to claim 51 wherein said ionic species comprises a component selected from the group consisting of arsenate, selenate, chromate, borate, perchlorate, fluoride and combinations thereof.

54. The method according to claim 51 wherein said solution is groundwater.

55. The method according to claim 51 wherein said media is in a form of a powder having a water content characterized by a loss on ignition of at least 40% when heated at 1000° C. for 1 hour.

56. The method according to claim 55 wherein said media comprises zirconium hydroxide.

57. The method according to claim 56 wherein said media has a density upon tamping to constant volume, of at least about 0.7 g/ml.

58. The method according to claim 51 wherein said media comprises titanium hydroxide.

59. The method according to claim 51 wherein said solution has a pH ranging from about 6.5 to about 7.5.

* * * * *